(12) United States Patent
Yoshimoto et al.

(10) Patent No.: US 10,985,893 B2
(45) Date of Patent: Apr. 20, 2021

(54) BASE STATION APPARATUS, TERMINAL APPARATUS, AND COMMUNICATION METHOD FOR BASE STATION APPARATUS AND TERMINAL APPARATUS

(71) Applicants: SHARP KABUSHIKI KAISHA, Sakai (JP); FG Innovation Company Limited, Tuen Mun (HK)

(72) Inventors: Takashi Yoshimoto, Sakai (JP); Jungo Goto, Sakai (JP); Osamu Nakamura, Sakai (JP); Yasuhiro Hamaguchi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/482,159

(22) PCT Filed: Jan. 30, 2018

(86) PCT No.: PCT/JP2018/002903
§ 371 (c)(1),
(2) Date: Jul. 30, 2019

(87) PCT Pub. No.: WO2018/143174
PCT Pub. Date: Aug. 9, 2018

(65) Prior Publication Data
US 2019/0394009 A1    Dec. 26, 2019

(30) Foreign Application Priority Data
Feb. 3, 2017   (JP) .............................. JP2017-018540

(51) Int. Cl.
*H04L 5/00* (2006.01)
*H04W 72/04* (2009.01)

(52) U.S. Cl.
CPC ............ *H04L 5/0094* (2013.01); *H04L 5/001* (2013.01); *H04L 5/0055* (2013.01); *H04W 72/0446* (2013.01)

(58) Field of Classification Search
CPC ... H04W 72/04; H04W 2/0446; H04W 28/04; H04L 5/001; H04L 5/0094; H04L 5/0055
See application file for complete search history.

(56) References Cited

U.S. PATENT DOCUMENTS

2013/0034064 A1*   2/2013   Nam ..................... H04L 5/0091
                                                         370/329

FOREIGN PATENT DOCUMENTS

| JP | 2016-504061 A | 2/2016 |
| WO | 2014/074590 A1 | 5/2014 |

OTHER PUBLICATIONS

Huawei et al., "Overview of frame structure for NR", R1-166102, 3GPP TSG RAN WG1 Meeting #86, Gothenburg, Sweden, Aug. 22-26, 2016.

(Continued)

*Primary Examiner* — Anez C Ebrahim
(74) *Attorney, Agent, or Firm* — ScienBiziP, P.C.

(57) ABSTRACT

Included are a receiver configured to receive first downlink data mapped to the first component carrier and second downlink data mapped to the second component carrier; and a transmitter configured to transmit a signal for indicating delivery confirmation of the first downlink data and the second downlink data. A timing to transmit the signal for indicating the delivery confirmation is defined by a prescribed number of time slots, and a length of each of the time slots is configured based on a subcarrier spacing of the first component carrier and a subcarrier spacing of the second component carrier.

6 Claims, 18 Drawing Sheets

(56) References Cited

OTHER PUBLICATIONS

Mediatek Inc., "Discussion on resource allocation of NB-PUSCH", R1-160774, 3GPP TSG RAN WG1 Meeting #84, St Julian's, Malta, Feb. 15-19, 2016.
Panasonic, "Use of multiple numerologies in NR", R1-167439, 3GPP TSG RAN WG1 Meeting #86, Gothenburg, Sweden Aug. 22-26, 2016.
Mediatek Inc., "Consideration on DL HARQ-ACK transmission for NB-IOT", R1-160771, 3GPP TSG RAN WG1 Meeting #84, St Julian's, Malta, Feb. 15-19, 2016.
Sharp et al., "Reduced processing time for different UL and DL sTTI lengths", R1-167614, 3GPP TSG RAN WG1 Meeting #86, Gothenburg, Sweden Aug. 22-26, 2016.
Catt, "Explicit HARQ and scheduling timing design for LTE sTTI", R1-1611360, 3GPP TSG RAN WG1 Meeting #87, Nov. 14-18, 2016.
3rd Generation Partnership Project; Technical Specification Group Radio Access Network; Study on Scenarios and Requirements for Next Generation Access Technologies; (Release 14), 3GPP TR 38.913 V14.0.0 (Oct. 2016).
Media Tek Inc., "An RX based interference mitigation method for waveform with multiple numerologies", 3GPP TSG RAN WG1 Meeting #86, R1-167529, Gothenburg, Sweden, Aug. 22-26, 2016.
Huawei, HiSilicon., "UL control channels for CA and DC", 3GPP TSG RAN WG1 Meeting #87, R1-1611653, Reno, USA, Nov. 14-18, 2016.
NTT Docomo, Inc., "Data scheduling and HARQ-ACK feedback procedures for NR", 3GPP TSG RAN WG1 AH_NR Meeting, R1-1700625, Spokane, USA, Jan. 16-20, 2017.
LG Electronics, "Discussion on wider bandwidth including CA/DC", RI-1700529, 3GPP TSG RAN WG1 NR Ad-Hoc Meeting, Spokane, USA, Jan. 16-20, 2017.
Huawei et al., "RRC Support of Multiple Numerologies", R2-1700097, 3GPP TSG-RAN WG2 Ad Hoc, Spokane, USA, Jan. 17-19, 2017.
MCC Support, "Final Report of 3GPP TSG RAN WG1 #86bis v1.0.0(Lisbon, Portugal, Oct. 10-14, 2016)", R1-1611081, 3GPP TSG RAN WG1 Meeting #87, Reno, USA, Nov. 14-18, 2016.
Qualcomm Incorporated, "CA with mixed numerology", R1-1713456, 3GPP TSG RAN WG1 Meeting #90, August 21-25, 2017, Prague, Czech Republic.
LG Electronics, "Support of cross-CC DCI/UCI transmission for NR CA", R1-1710339, 3GPP TSG RAN WG1 NR Ad-Hoc#2, Qingdao, P.R. China Jun. 27-30, 2017.

* cited by examiner

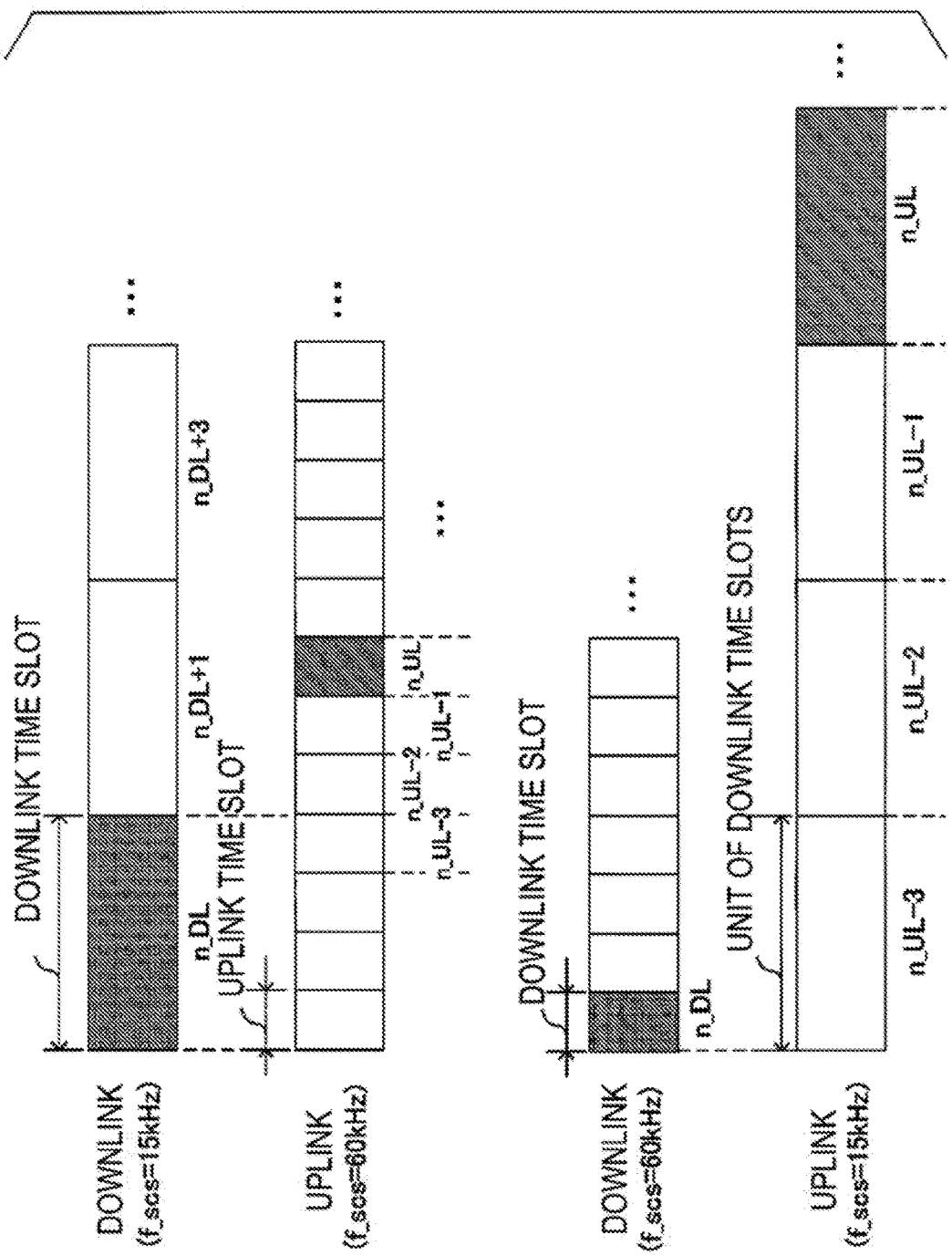

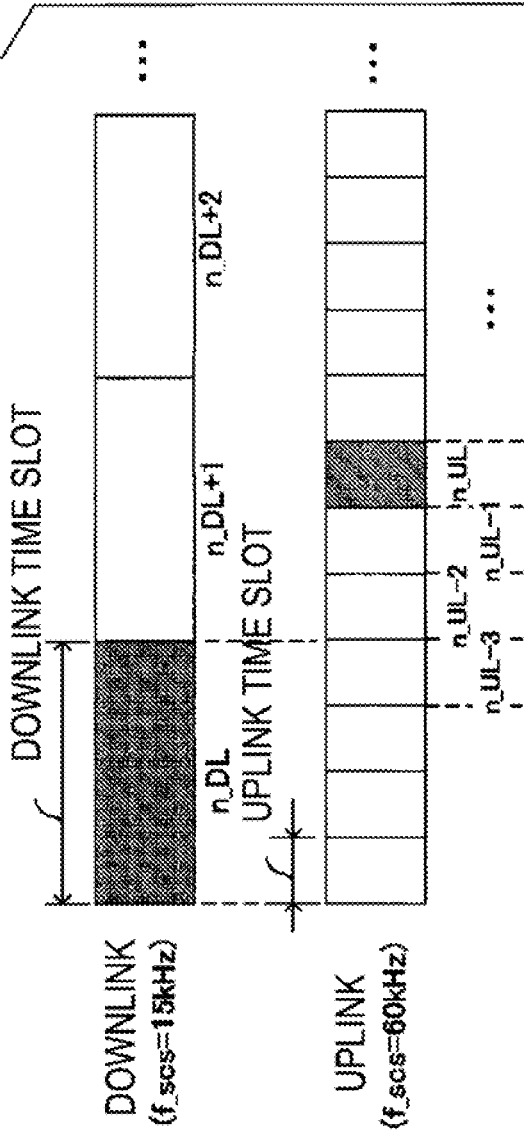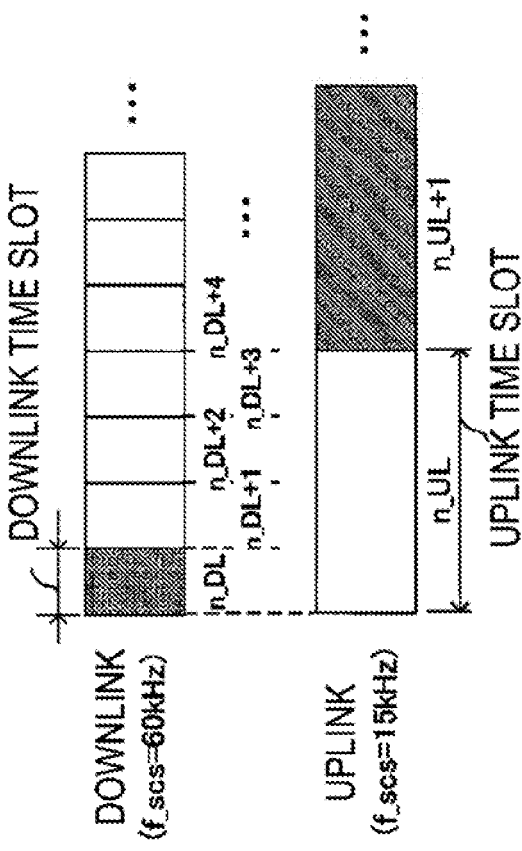

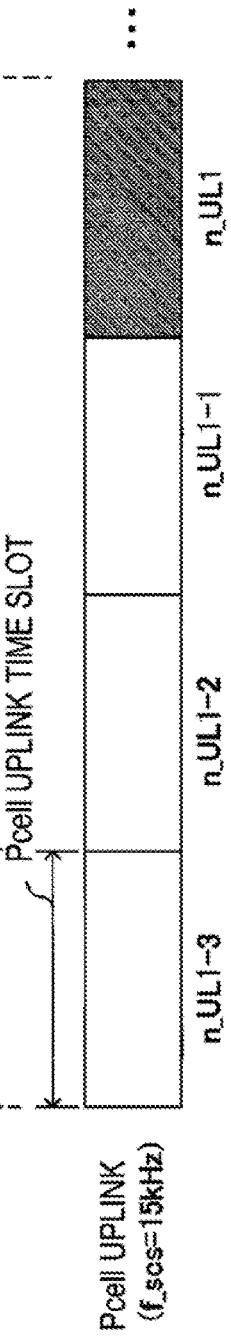

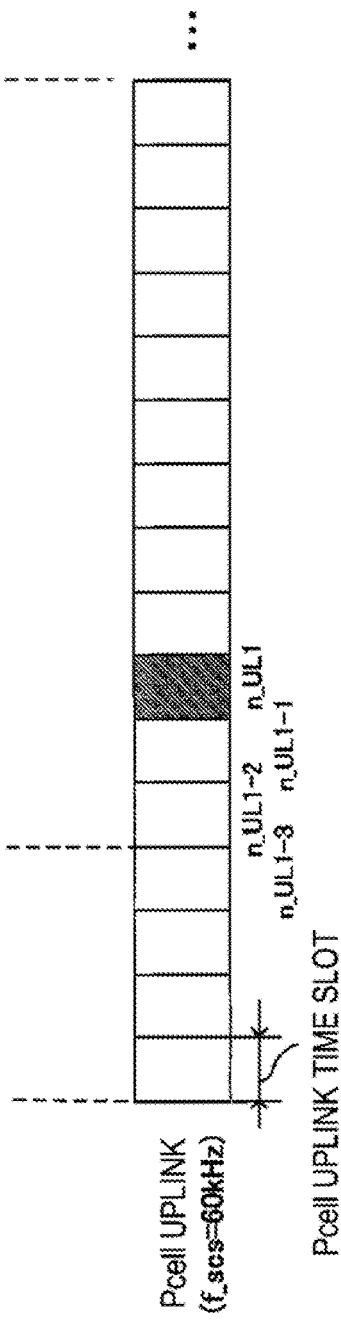

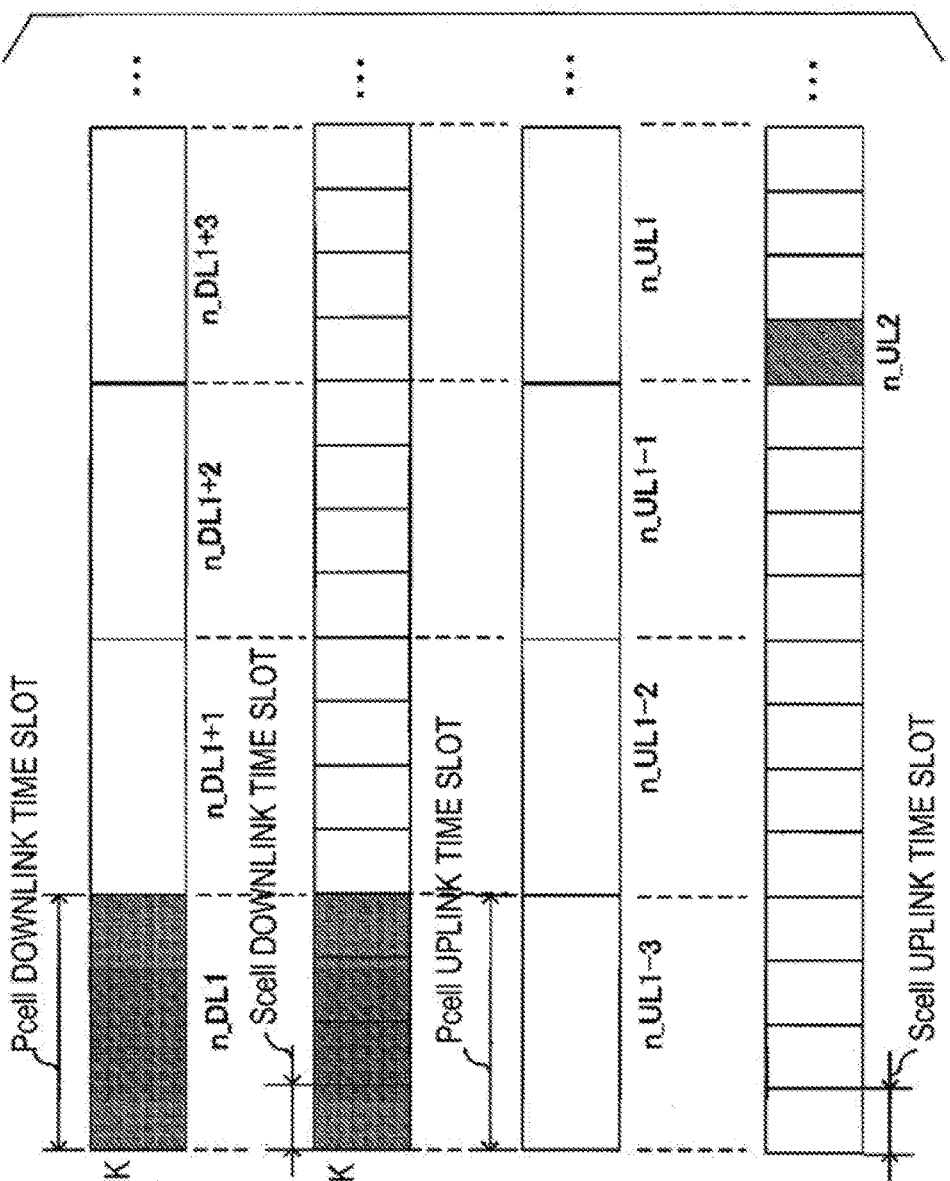

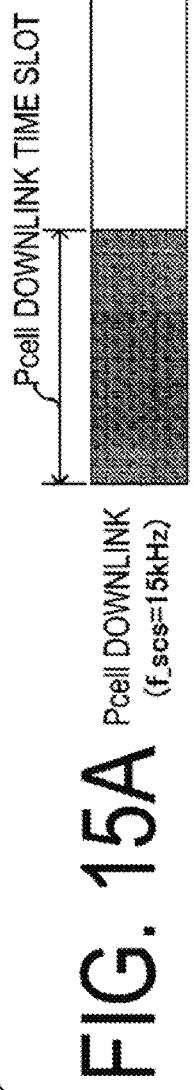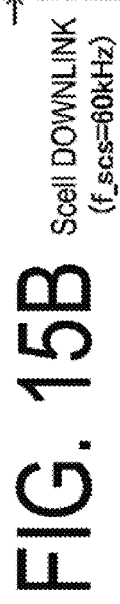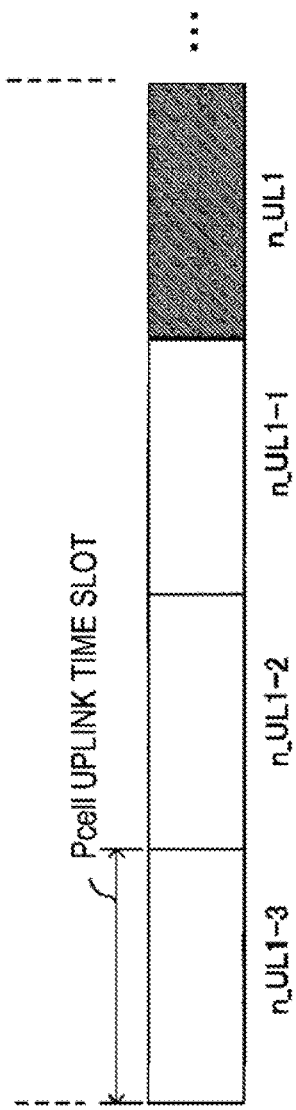

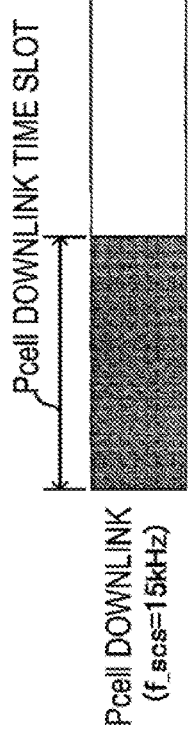
FIG. 16A
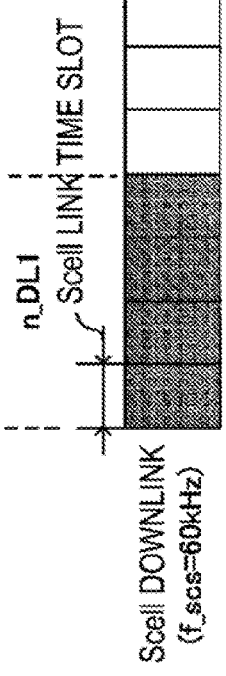
FIG. 16B
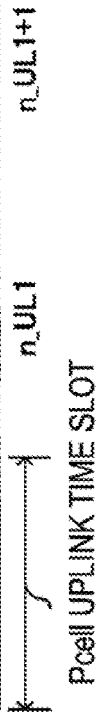
FIG. 16C

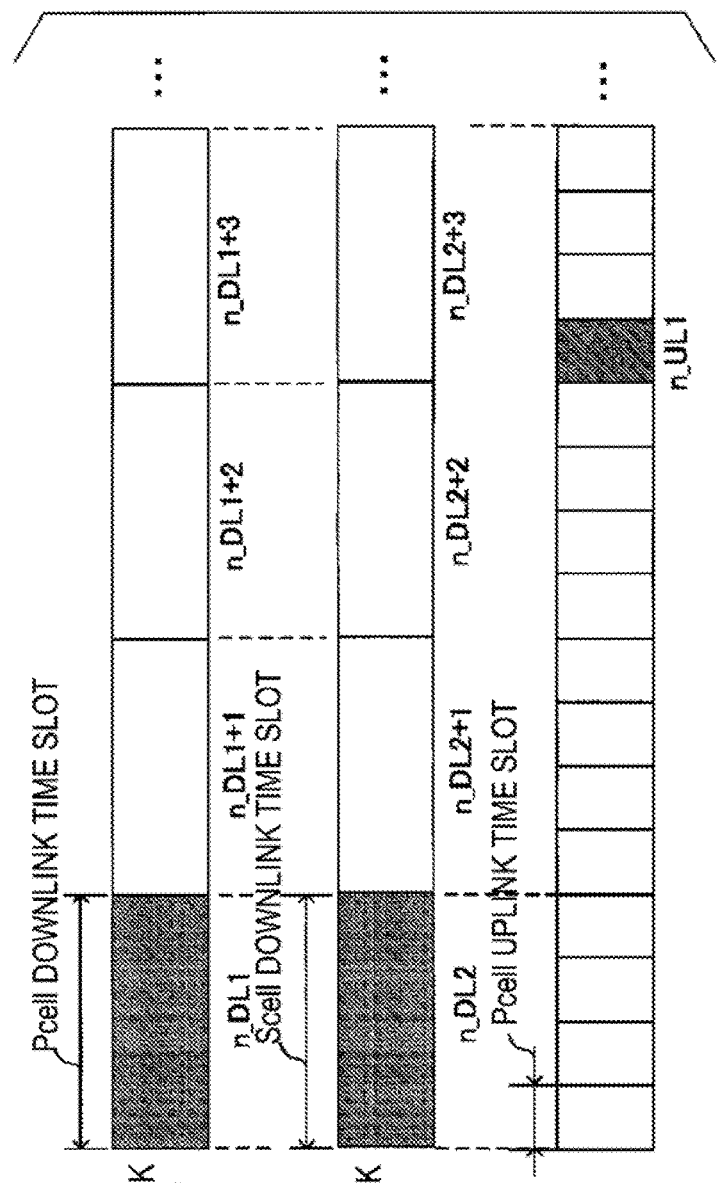

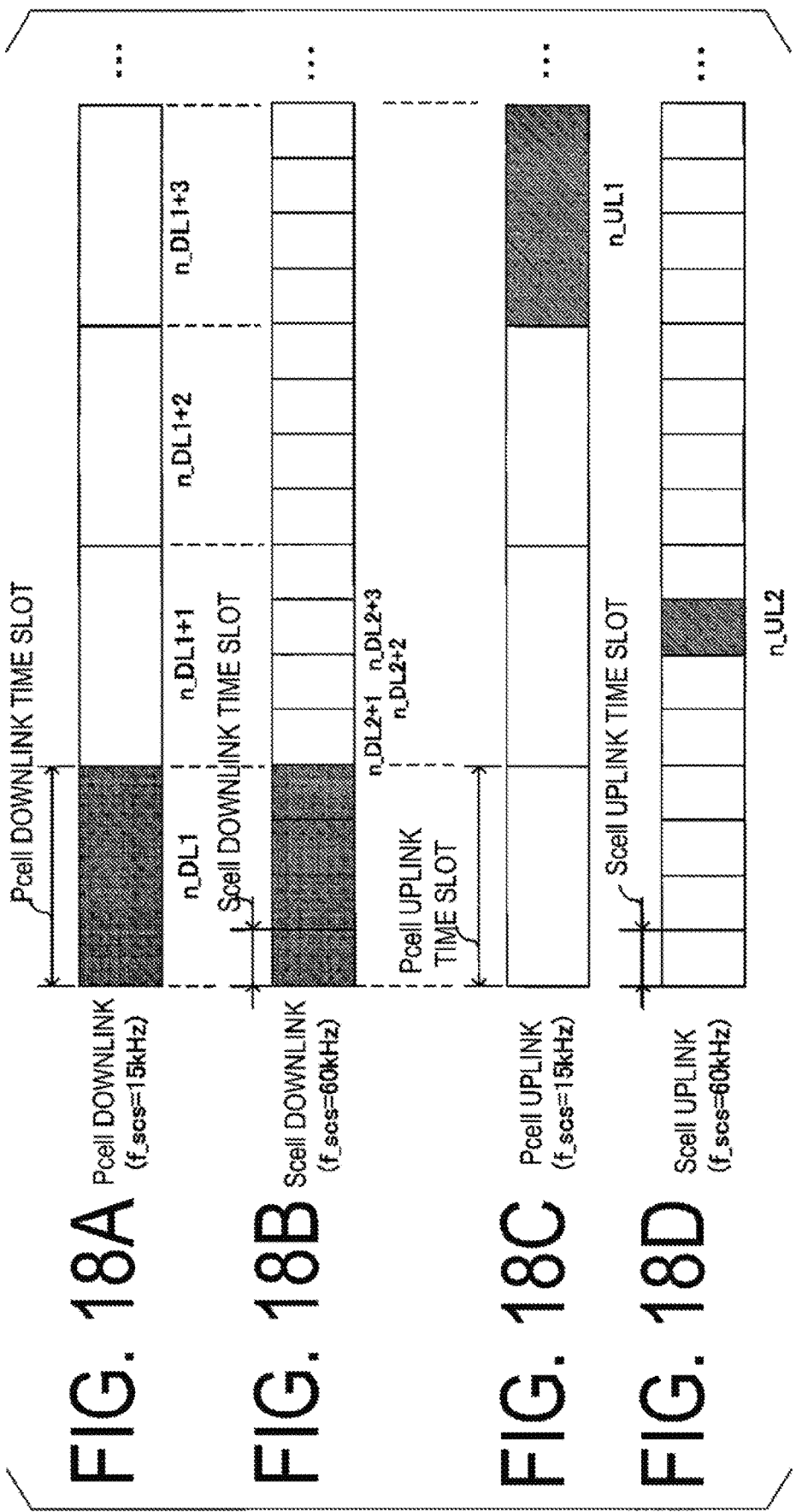

BASE STATION APPARATUS, TERMINAL APPARATUS, AND COMMUNICATION METHOD FOR BASE STATION APPARATUS AND TERMINAL APPARATUS

TECHNICAL FIELD

The present invention relates to a base station apparatus, a terminal apparatus, and a communication method for the same.

This application claims priority based on JP 2017-018540 filed on Feb. 3, 2017, the contents of which are incorporated herein by reference.

BACKGROUND ART

In a mobile communication system such as Long Term Evolution (LTE), which is standardized by the Third Generation Partnership Project (3GPP), wireless multiple access based on Orthogonal Frequency Division Multiplexing (OFDM) is employed (referred to as Orthogonal Frequency Division Multiple Access (OFDMA)). By inserting Cyclic Prefixes (CPs), the OFDM can maintain signal periodicity in a frequency selective fading channel. In the OFDMA in LTE, a base station apparatus uses subcarriers with the same subcarrier spacing to communicate with all terminal apparatuses in a cell, and thus, orthogonality between the subcarriers is maintained.

In 3GPP, multiple access of a fifth generation mobile communication system (5G) using the OFDMA have also been studied. In 5G, much effort has been made to specify wireless multiple access that meets requirements for three use cases: enhanced Mobile Broadbands (eMBBs) for high-capacity communication with high frequency utilization efficiency, massive Machine Type Communication (mMTC) accommodating a multiplicity of terminals, and Ultra-Reliable and Low Latency Communication (uRLLC) realizing reliable, low-latency communication (NPL 1). Thus, in the OFDMA in 5G, an OFDM symbol length and subcarrier spacings suitable for each use case are used. For example, a smaller OFDM symbol length is used for the uRLLC than for the eMBB to achieve low-latency communication. In addition, in the same use case, different subcarrier spacings and OFDM symbol lengths may be configured depending on frequency fluctuation, time fluctuation, frequency band used, and the like. The OFDM symbol length can be adjusted by varying the subcarrier spacings (NPL 2).

In a mobile communication system, Quality of Service (QoS, reception quality) in each use case is controlled by retransmission control using a Hybrid Automatic Repeat reQuest (HARQ). For example, in a case that the base station apparatus transmits downlink data to the terminal apparatus, the terminal apparatus transmits a positive acknowledgement (ACK)/negative acknowledgement (NACK) to the downlink data to the base station apparatus at a prescribed timing.

CITATION LIST

Non Patent Literature

NPL 1: "3rd Generation Partnership Project; Technical Specification Group Radio Access Network; Study on Scenarios and Requirements for Next Generation Access Technologies; (Release 14)", 3GPP TR 38.913 v14.0.0 (2016-10)

NPL 2: R1-167529, 3GPP TSG RAN WG1 Meeting #86, Gothenburg, Sweden, 22-26 Aug. 2016

SUMMARY OF INVENTION

Technical Problem

However, due to the difference in subcarrier spacings between an uplink and a downlink, or the like, the OFDM symbol length for transmission of downlink data differs from the OFDM symbol length for transmission of the ACK/NACK in the uplink. In such a case, transmission timings/reception timings for the ACK/NACK need to be adjusted between the base station apparatus and the terminal apparatus.

An aspect of the present invention is made in view of such circumstances, and an object of an aspect of the present invention is to provide a base station apparatus, a terminal apparatus, and a communication method in a communication system in which the base station apparatus communicates with the terminal apparatus by using symbol lengths varying between uplink and downlink, the terminal apparatus, the base station apparatus, and the communication method enabling a transmission timing for data and a transmission timing for an ACK/NACK for the data to be appropriately fitted (adjusted) to each other.

Solution to Problem

To address the above-mentioned drawbacks, a base station apparatus, a terminal apparatus, and a communication method according to an aspect of the present invention are configured as follows.

(1) An aspect of the present invention is a terminal apparatus for communicating with a base station apparatus by using a first component carrier and a second component carrier through carrier aggregation, the terminal apparatus including: a receiver configured to receive first downlink data mapped to the first component carrier and second downlink data mapped to the second component carrier; and a transmitter configured to transmit a signal for indicating delivery confirmation of the first downlink data and the second downlink data, wherein a timing to transmit the signal for indicating the delivery confirmation is defined by a prescribed number of time slots, and a length of each of the time slots is configured based on a subcarrier spacing of the first component carrier and a subcarrier spacing of the second component carrier.

(2) In an aspect of the present invention, the transmitter transmits the signal for indicating the delivery confirmation by using either the first component carrier or the second component carrier, and the length of each of the time slots is configured based on the subcarrier spacing of the component carrier that transmits the signal for indicating the delivery confirmation.

(3) In an aspect of the present invention, the transmitter transmits the signal for indicating the delivery confirmation by using the second component carrier; and the length of each of the time slots is configured based on the subcarrier spacing of the first component carrier.

(4) In an aspect of the present invention, the transmitter transmits the signal for indicating the delivery confirmation by using either the first component carrier or the second component carrier, and the length of each of the time slots is configured based on a larger one of the subcarrier spacing of the first component carrier that receives the first downlink data and the subcarrier spacing of the second component carrier that receives the second downlink data.

(5) In an aspect of the present invention, the transmitter transmits the signal for indicating the delivery confirmation by using either the first component carrier or the second component carrier, and the length of each of the time slots is configured based on a smaller one of the subcarrier spacing of the first component carrier that receives the first downlink data and the subcarrier spacing of the second component carrier that receives the second downlink data.

(6) In an aspect of the present invention, the receiver receives, in the first component carrier, information for indicating the subcarrier spacing of the second component carrier.

(7) An aspect of the invention is a base station apparatus for communicating with a terminal apparatus by using a first component carrier and a second component carrier through carrier aggregation, the base station apparatus including: a transmitter configured to transmit first downlink data mapped to the first component carrier and second downlink data mapped to the second component carrier; and a receiver configured to receive a signal for indicating delivery confirmation of the first downlink data and the second downlink data, wherein a timing to transmit the signal for indicating the delivery confirmation is defined by a prescribed number of time slots, and a length of each of the time slots is configured based on a subcarrier spacing of the first component carrier and a subcarrier spacing of the second component carrier.

(8) An aspect of the present invention is a communication method for a terminal apparatus for communicating with a base station apparatus by using a first component carrier and a second component carrier through carrier aggregation, the communication method including the steps of: receiving first downlink data mapped to the first component carrier and second downlink data mapped to the second component carrier; and transmitting a signal for indicating delivery confirmation of the first downlink data and the second downlink data, wherein a timing to transmit the signal for indicating the delivery confirmation is defined by a prescribed number of time slots, and a length of each of the time slots is configured based on a subcarrier spacing of the first component carrier and a subcarrier spacing of the second component carrier.

(9) An aspect of the present invention is a communication method for a base station apparatus for communicating with a terminal apparatus by using a first component carrier and a second component carrier through carrier aggregation, the communication method including the steps of: transmitting first downlink data mapped to the first component carrier and second downlink data mapped to the second component carrier; and receiving a signal for indicating delivery confirmation for the first downlink data and second downlink data, wherein a timing to transmit the signal for indicating the delivery confirmation is defined by a prescribed number of time slots, and a length of each of the time slots is configured based on a subcarrier spacing of the first component carrier and a subcarrier spacing of the second component carrier.

Advantageous Effects of Invention

According to one or more aspects of the present invention, in a communication system in which the base station apparatus and the terminal apparatus communicate with each other by using symbol lengths varying between uplink and downlink, a transmission timing for information data and a transmission timing for an ACK/NACK for the information data can be appropriately fitted (adjusted) to each other.

BRIEF DESCRIPTION OF DRAWINGS

FIGS. 6A and 6B are diagrams illustrating another example of ACK/NACK transmission timings according to the first embodiment.

FIGS. 7A and 7B are diagrams illustrating another example of ACK/NACK transmission timings according to the first embodiment.

FIGS. 12A to 12C are diagrams illustrating an example of ACK/NACK transmission timings in carrier aggregation according to the second embodiment.

FIGS. 13A to 13C are diagrams illustrating another example of ACK/NACK transmission timings in the carrier aggregation according to the second embodiment.

FIGS. 14A to 14D are diagrams illustrating another example of the ACK/NACK transmission timings in the carrier aggregation according to the second embodiment.

FIGS. 15A to 15C are diagrams illustrating another example of the ACK/NACK transmission timings in the carrier aggregation according to the second embodiment.

FIGS. 16A to 16C are diagrams illustrating another example of the ACK/NACK transmission timings in the carrier aggregation according to the second embodiment.

FIGS. 17A to 17C are diagrams illustrating another example of the ACK/NACK transmission timings in the carrier aggregation according to the second embodiment.

FIGS. 18A to 18D are diagrams illustrating another example of the ACK/NACK transmission timings in the carrier aggregation according to the second embodiment.

DESCRIPTION OF EMBODIMENTS

Figure 1:
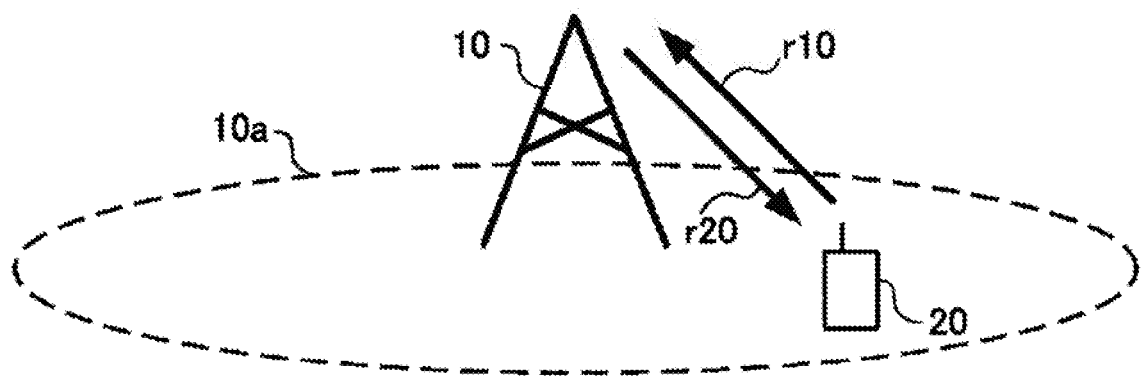
FIG. 1 is a diagram illustrating an example of a configuration of a communication system according to a first embodiment.

A communication system according to the following embodiments includes a base station apparatus (cell, small cell, serving cell, component carrier, eNodeB, Home eNodeB, gNodeB, or access point) and a terminal apparatus (User Equipment (UE), terminal, mobile station, mobile terminal, or subscriber unit). In the communication system, in a case of downlink, the base station apparatus serves as a transmission device (transmission point, transmit antenna group, or transmit antenna port group), and the terminal apparatus serves as a reception device (reception point, reception terminal, receive antenna group, or receive antenna port group). In a case of uplink, the base station apparatus serves as a reception device, and the terminal apparatus serves as a transmission device. The communication system is also applicable to D2D (Device-to-Device) communication. In this case, the terminal apparatus serves as both the transmission device and the reception device. Note that the base station apparatus includes a Remote Radio Head (RRH, a device that is smaller than the base station apparatus and that includes an outdoor radio unit, also referred to as a Remote Radio Unit (RRU)). The RRH is also referred to as a remote antenna or a distributed antenna. The RRH is also considered as a special form of the base station apparatus. For example, the RRH can be considered as a base station apparatus that includes only a signal processing unit and for which other base station apparatuses, for example, configure parameters used for the RRH and determine a schedule for the RRH.

The communication system is not limited to data communication between a terminal apparatus and a base station apparatus in which human beings intervene, and is also applicable to forms of data communication such as Machine Type Communication (MTC), Machine-to-Machine Communication (M2M communication), communication for Internet of Things (IoT), and Narrow Band-IoT (NB-IoT), which do not require human intervention (these forms of communication are hereinafter referred to as MTC). In this case, the terminal apparatus is also referred to as an MTC terminal.

The wireless multiple access of the communication system can use, in the uplink and the downlink, Orthogonal Frequency Multiple Access (OFDMA) based on an Orthogonal Frequency Division Multiplexing (OFDM) transmission scheme. The wireless multiple access of the communication system can also use SC-FDMA based on a Discrete Fourier Transform-Spread-OFDM (DFT-S-OFDM) or Clustered DFT-S-OFDM transmission scheme. The communication system can also use Filter Bank Multi Carrier (FBMC) to which a filter is applied, Filtered-OFDM (f-OFDM), Universal Filtered-OFDM (UF-OFDM), Windowing-OFDM (W-OFDM), or Sparse Code Multiple Access (SCMA) which uses sparse codes. Furthermore, DFT precoding may be applied to the communication system, and signal waveforms obtained using the filters described above may be used for the communication system. Furthermore, the communication system may apply code spreading, interleaving, sparse codes, and the like in the transmission scheme. Note that, in the following embodiments, DFT-S-OFDM transmission is used for the uplink, whereas OFDM transmission is used for the downlink but that the embodiments are not limited to this and any other transmission scheme can be applied to the embodiments.

The base station apparatus and the terminal apparatus according to the following embodiments can communicate using a frequency band called a licensed band for which permission for use (a license) is obtained from a country or region where a radio operator provides a service, and/or a frequency band called an unlicensed band requiring no permission for use (a license) from the country or region.

According to the present embodiment, "X/Y" includes the meaning of "X or Y". According to the present embodiment, "X/Y" includes the meaning of "X and Y". According to the present embodiment, "X/Y" includes the meaning of "X and/or Y".

First Embodiment

FIG. 1 is a diagram illustrating an example of a configuration of a communication system according to the present embodiment. The communication system according to the present embodiment includes a base station apparatus 10 and a terminal apparatus 20. Coverage 10a is a range (a communication area) in which the base station apparatus 10 can connect to the terminal apparatus 20 (the range is also referred to as a cell). The terminal apparatus 20 transmits, in an uplink r10, uplink physical channels and uplink physical signals to the base station apparatus 10. The base station apparatus 10 transmits, in a downlink r20, downlink physical channels and downlink physical signals to the terminal apparatus 20. Note that, in the coverage 10a, the base station apparatus 10 is capable of accommodating multiple terminal apparatuses 20 and that the number of terminal terminals accommodated is not limited to the number illustrated in FIG. 1.

The communication system of FIG. 1 includes the following uplink physical channels. The uplink physical channels are used to transmit information output from a higher layer.

Physical uplink control channel
Physical uplink shared channel
Physical random access channel The physical uplink control channel is a physical channel used to transmit Uplink Control Information (UCI).

The uplink control information includes a positive acknowledgement (ACK)/a negative acknowledgement (NACK) for downlink data (a downlink transport block, a Downlink-Shared Channel (DL-SCH)). The ACK/NACK is also referred to as a signal indicating delivery confirmation, an HARQ-ACK, or HARQ feedback. The uplink control information can also include a Scheduling Request (SR).

The uplink control information can include Channel State Information (CSI) for the downlink. The channel state information refers to a Rank Indicator (RI) indicating a preferable spatial multiplexing number (number of layers), a Precoding Matrix Indicator (PMI) indicating a preferable precoder, a Channel Quality Indicator (CQI) specifying a preferable transmission rate, and the like. The PMI indicates a codebook determined by the terminal apparatus. The codebook is associated with precoding of a physical downlink shared channel. The CQI can be a preferable modulation scheme (for example, Binary Phase Shift Keying (BPSK), quadrature Phase Shift Keying (QPSK), 16 quadrature amplitude modulation (16QAM), 64QAM, or 256QAM) or preferable coding rate for a prescribed band.

The physical uplink shared channel is a physical channel used to transmit uplink data (an uplink transport block, UL-SCH). The physical uplink shared channel may be used to transmit the ACK/NACK for downlink data and/or the channel state information. The physical uplink shared channel may be used to transmit the uplink control information. The physical uplink shared channel may be generated by adding a Cyclic Redundancy Check (CRC) to uplink data. The CRC may be scrambled using a sequence representing an identifier of the terminal apparatus (also referred to as a User Equipment Identifier (UE ID)) (the scrambling is also referred to as an exclusive logical sum operation, masking, or encryption). As the UE ID, any of the following is used: a Cell-Radio Network Temporary Identifier (C-RNTI), a Temporary C-RNTI (T C-RNTI), a Semi Persistent Scheduling C-RNTI (SPS C-RNTI), and the like. For example, the UE ID is allocated to the terminal apparatus by the base station apparatus in a case that the terminal apparatus accesses a new cell using a cell update procedure. The base station apparatus notifies each terminal apparatus of the UE ID. The UE ID can also be included in message 2 (Random Access Response (RAR)/message 4 (Contention Resolution) in a random access procedure. The UE ID can also be included in a Radio Resource Control (RRC) message.

The physical uplink shared channel is used to transmit an RRC message. The RRC message is information/signal that is processed in a radio resource control layer. The RRC message can include UE Capability of the terminal apparatus. The UE Capability is information indicating functions supported by the terminal apparatus. The physical uplink shared channel is used to transmit a MAC Control Element (CE). The MAC CE is information/signal that is processed (transmitted) in a Medium Access Control (MAC) layer. For example, a power headroom may be included in the MAC CE and may be reported via the physical uplink shared channel. In other words, a MAC CE field is used for indicating a level of the power headroom. The uplink data can include the RRC message and the MAC CE.

The physical random access channel is used to transmit a preamble used for random access.

In the uplink, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS).

The demodulation reference signal is associated with transmission of the physical uplink shared channel or the physical uplink control channel. For example, the base station apparatus 10 uses the demodulation reference signal to perform channel compensation in a case of demodulating the physical uplink shared channel or the physical uplink control channel. A demodulation reference signal sequence may be generated in association with a cell ID of the base station apparatus 10. The demodulation reference signal sequence may be generated by application of cyclic shifts and Orthogonal Cover Codes (OCCs).

The sounding reference signal is not associated with transmission of the physical uplink shared channel or the physical uplink control channel. For example, the base station apparatus 10 uses the sounding reference signal for measurement (CSI Measurement) of the uplink channel state such as Radio Resource Management measurement (RRM measurement).

In the communication system in FIG. 1, the following downlink physical channels are used. The downlink physical channels are used for transmitting information output from the higher layer.

Physical broadcast channel
Physical control format indicator channel
Physical hybrid automatic repeat request indicator channel
Physical downlink control channel
Physical downlink shared channel The physical broadcast channel is used for broadcasting a Master Information Block (MIB, a Broadcast Channel (BCH)) that is shared by terminal apparatuses. The MIB is system information. The physical broadcast channel includes control information to be broadcasted. For example, the physical broadcast channel includes information such as a downlink system band, a System Frame Number (SFN), and the number of transmit antennas used by the base station apparatus.

The physical control format indicator channel is used for notifying regions to which the downlink control information can be transmitted. For example, the physical control format indicator channel indicates the number of OFDM symbols reserved starting from the beginning of each subframe in order to transmit the downlink control information.

The physical hybrid automatic repeat request indicator channel is used to transmit the ACK/NACK for the physical uplink shared channel. The terminal apparatus can transmit the ACK/NACK at a transmission timing that is predetermined or/and notified from the base station apparatus to the terminal apparatus by using the RRC/DCI.

The physical downlink control channel is used to transmit Downlink Control Information (DCI). The downlink control information defines multiple formats (also referred to as DCI formats) based on application or a transmission mode. Each format is used depending on the application or the transmission mode. The downlink control information includes control information for downlink data transmission (control information related to downlink data transmission) and control information for uplink data transmission (control information related to uplink data transmission). The transmission mode is configured based on the number of transmit antenna ports, or a difference in transmission method such as diversity transmission (Space-Frequency Block Coding (SFBC), Frequency Switched Transmit Diversity (FSTD), Cyclic Division Diversity (CDD)) or beamforming.

A DCI format for downlink data transmission is used for scheduling of the physical downlink shared channel. The DCI format for the downlink data transmission is also referred to as downlink grant (DL Grant or downlink assignment). The DCI format for the downlink data transmission includes downlink control information such as information related to resource allocation of the physical downlink shared channel, information related to a Modulation and Coding Scheme (MCS) for the physical downlink shared channel, an HARQ process number, information related to retransmission of the downlink data. The DCI format for the downlink data transmission can include Transmit Power Control (TPC) for the physical uplink channels (for example, the physical uplink control channel and the physical uplink shared channel) and the reference signals (for example, the sounding reference signal).

A DCI format for uplink data transmission is used to notify the terminal apparatus of control information related to transmission of the physical uplink shared channel. The DCI format for the uplink data transmission is also referred to as uplink grant (UL Grant or uplink assignment). The DCI format for uplink data transmission includes uplink control information such as information related to the resource allocation of the physical uplink shared channel, information related to the MCS for the physical uplink shared channel, information related to retransmission of uplink data (physical uplink shared channel), transmit power control for the physical uplink channel, information related to cyclic shifts for a demodulation reference signal, downlink Channel State Information (CSI) (also referred to as reception quality information), a request (CSI request), the HARQ process number, and the like. Note that one or more pieces of information included in the DCI format for the uplink data transmission may be included in the DCI format for the downlink data transmission.

The physical downlink control channel is generated by adding a Cyclic Redundancy Check (CRC) to the downlink control information. In the physical downlink control channel, the CRC is scrambled using the identifier (UE ID) of the terminal apparatus. For example, the CRC is scrambled using a Cell-Radio Network Temporary Identifier (C-RNTI).

The physical downlink shared channel is used to transmit downlink data (a downlink transport block, DL-SCH). The physical downlink shared channel is used to transmit a system information message (System Information Block (SIB)). The SIB can be transmitted in common (cell-specific) to multiple terminal apparatuses in a cell. Terminal apparatus-specific (user-specific) information is transmitted by using an SIB dedicated to a given terminal apparatus. Note that some or all of system information messages can be included in the RRC message.

The physical downlink shared channel is used to transmit the RRC message. The RRC message transmitted from the base station apparatus may be common (cell-specific) to multiple terminal apparatuses in a cell. Information common to the terminal apparatuses in the cell may be transmitted using cell-specific RRC messages. The RRC message transmitted from the base station apparatus may be a message dedicated to a given terminal apparatus (also referred to as dedicated signaling). Terminal apparatus-specific (user-specific) information may be transmitted by using an RRC message dedicated to the given terminal apparatus.

The physical downlink shared channel is used to transmit a MAC CE. The RRC message and/or the MAC CE is also referred to as higher layer signaling. The physical downlink shared channel is used for the base station apparatus to transmit information data to each terminal apparatus.

The physical downlink shared channel is generated by addition of the Cyclic Redundancy Check (CRC). The CRC is scrambled using the identifier (UE ID) of the terminal apparatus. The terminal apparatus detects (for example, demodulates or decodes) the physical downlink shared channel, based on the downlink control information scrambled with the same UE ID.

In the downlink in FIG. 1, a Synchronization Signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to acquire/track synchronization in a frequency domain and a time domain in the downlink. For example, two synchronization signals: a Primary Synchronization Signal (PSS) and a Secondary Synchronization Signal (SSS) are used. The terminal apparatus uses the PSS to acquire symbol synchronization. The terminal apparatus uses the SSS to acquire frame synchronization. The PSS and the SSS are associated with the cell ID. The terminal apparatus can acquire the cell ID using the PSS and the SSS. A base station apparatus downlink reference signal is used for the terminal apparatus to perform channel compensation on the downlink physical channel. For example, the downlink reference signal is used to demodulate the physical broadcast channel, the physical downlink shared channel, and the physical downlink control channel. The downlink reference signal is used for the terminal apparatus to preform calculation (measurement) of the downlink Channel State Information such as RRM measurement. In addition, reference signals used to demodulate various channels may differ from reference signals used for measurement (for example, the Demodulation Reference Signal (DMRS) in LTE is used as the reference signal used to demodulate the various channels, and the CSI-RS is used for measurement. The reference signals used to demodulate the various channels may be the same as the reference signals used for measurement. (For example, a Cell-specific Reference Signal (CRS)).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the MAC layer are referred to as transport channels. A unit of transport channel used in the MAC layer is also referred to as a transport block (TB) or a MAC Protocol Data Unit (PDU). The transport block is a unit of data that the MAC layer delivers to the physical layer. In the physical layer, the transport block is mapped to a codeword, and coding processing or the like is performed for each codeword.

In FIG. 1, the base station apparatus 10 and the terminal apparatus 20 support multiple access based on grant (also referred to as grant-based multiple access, scheduled multiple access) in the uplink/downlink. In the downlink, the base station apparatus 10 transmits the downlink physical channel by using a physical resource (notified using the information related to the resource allocation) and the MCS notified to the terminal apparatus 20 by using the downlink grant. In the uplink, the terminal apparatus 20 transmits the uplink physical channel by using a physical resource (notified using the information related to the resource allocation), the MCS, and the like indicated in the uplink grant by the base station apparatus 10. The physical resource is a resource defined in the time domain (OFDM symbols or SC-FDMA symbols) and in the frequency domain (subcarriers).

The base station apparatus 10 and the terminal apparatus 20 can also support grant-free multiple access (also referred to as grant-less multiple access, contention based multiple access) in the uplink/downlink. For example, in uplink grant free multiple access, the terminal apparatus 20 transmits the uplink data (such as the uplink physical link channel) regardless of the reception of the uplink grant from the base station apparatus 10 (without reception of the uplink grant). The base station apparatus 10 can notify the terminal apparatus 20 of information indicating that the grant-free multiple access is supported, by using the broadcast channel (MIB)/RRC message/system information (e.g., SIB). The terminal apparatus 20 may notify the base station apparatus 10 of the UE Capability indicating that the grant-free multiple access is supported.

In the uplink grant free multiple access, the terminal apparatus 20 may randomly select a physical resource for transmission of the uplink data. For example, the terminal apparatus 20 is notified by the base station apparatus 10 of multiple available candidates for the physical resource as a resource pool. The resource pool is notified in the broadcast channel/RRC message/system information. The terminal apparatus 20 randomly selects a physical resource from the resource pool.

In the uplink grant free multiple access, an uplink multi-access resource is defined by a signature resource (Multi Access Signature Resource) and the physical resource (Multi Access Physical Resource). The physical resource and the signature resource may be used to identify the uplink physical channel transmitted by each terminal apparatus. Candidates for the signature resource are included in the resource pool. The terminal apparatus 20 selects a signature resource from the resource pool. The signature resource includes at least one multi-access signature from a group of multiple multi-access signatures (also referred to as a multi-access signature pool). The multi-access signature is information indicating a feature (mark or indicator) that distinguishes (identifies) the uplink physical channel transmitted by each terminal apparatus. The multi-access signature includes a spatial multiplexing pattern, a spreading code pattern (Walsh code, Orthogonal Cover Code (OCC), cyclic shifts for data spreading, sparse code, etc.), an interleave pattern, a demodulation reference signal pattern (reference signal sequence or cyclic shifts), transmit power, and the like. In the grant free multiple access, the terminal apparatus transmits the uplink data by using selected one or more multi-access signatures.

The base station apparatus 10 transmits the downlink signal to the terminal apparatus 20 by using OFDM with a subcarrier spacing f_scs. The terminal apparatus 20 transmits the uplink signal to the base station apparatus 10 by using DFT-s-OFDM with the subcarrier spacing f_scs. In the communication system illustrated in FIG. 1, multiple subcarrier spacings f_scs are defined for each of the uplink and the downlink. For example, the subcarrier spacing f_scs is defined by n_scs×f_scs·f_scs_o is a subcarrier spacing [Hz] used as a reference. n_scs is $2^a$, or $2^{(-a)}$ (a is a natural number). n_scs may be defined as $a^b$ (a is a natural number, b is 1 or −1).

Figure 2:
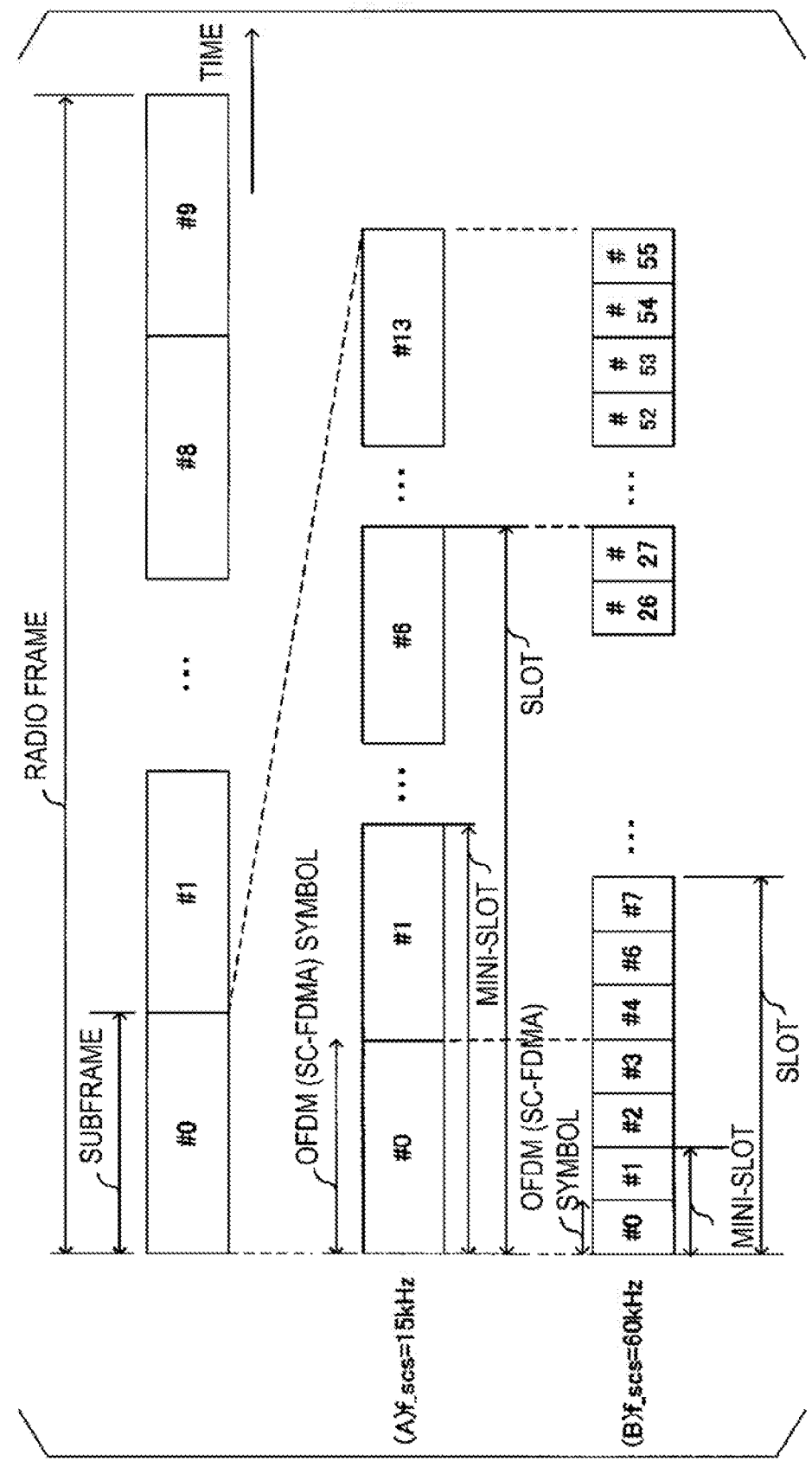
FIG. 2 is a diagram illustrating an example of a configuration of a radio frame in the communication system according to the first embodiment.

FIG. 2 is a diagram illustrating an example of a configuration of a radio frame in the communication system according to the present embodiment. Increasing the subcarrier spacing by a factor of n reduces an OFDM symbol length to 1/n. FIG. 2 is an example of n_scs=1 (f_scs=15 kHz) and n_scs=4 (f_scs=60 kHz) at f_scs_o=15 kHz. The OFDM symbol length at f_scs_o=15 kHz is ¼ of the OFDM symbol length at f_scs=60 kHz. Note that, in a case that DFT-s-OFDM is used, increasing the subcarrier spacing by a factor of n reduces an SC-FDMA symbol length to 1/n (in FIG. 2, the OFDM symbol length is replaced with the SC-FDMA symbol length).

In the downlink and the uplink, one radio frame includes multiple subframes. FIG. 2 is an example in which one radio frame includes 10 subframes. A subframe length is configured to be constant regardless of the subcarrier spacing. For example, in a case that the radio frame length is 10 ms, the subframe spacing is constant at 1 ms regardless of the subcarrier spacing. The subframe length is configured with reference to the OFDM symbol length at the reference subcarrier spacing f_scs _o=15 kHz. FIG. 2 illustrates an example in which the subframe length is equal to an interval of 14 OFDM symbols at f_scs _o=15 kHz (FIG. 12A). In a case of f_scs=60 kHz, one subframe includes 56 OFDM symbols (FIG. 12B).

One slot includes multiple OFDM symbols generated at a subcarrier spacing used for the base station apparatus 10 and the terminal apparatus 20 to transmit the physical channels. The number of OFDM symbols constituting the slot is constant regardless of the subcarrier spacing (the slot length at each subcarrier spacing is determined by the number of OFDM symbols). FIG. 2 illustrates an example in which one slot includes seven OFDM symbols. The slot length at f_scs=15 kHz is four times as large as the slot length of f_scs =60 kHz.

One mini-slot includes multiple OFDM symbols (e.g., two or four) generated at the subcarrier spacing used for the base station apparatus 10 and the terminal apparatus 20 to transmit the physical channels. The number of OFDM symbols constituting the mini-slot is constant regardless of the subcarrier spacing (the mini-slot length at each subcarrier spacing is determined by number of OFDM symbols). The number of OFDM symbols constituting the mini-slot is less than the number of OFDM symbols constituting the slot. At each subcarrier spacing, the mini-slot length is smaller than the slot length. FIG. 2 is an example in which one mini-slot includes two OFDM symbols. The mini-slot length at f_scs=15 kHz is four times the mini-slot length of f_scs=60 kHz.

The base station apparatus 10 can configure the number of OFDM symbols constituting the slot/mini-slot. The base station apparatus 10 can independently configure, at each subcarrier spacing, the number of OFDM symbols constituting the slot/mini-slot. For the number of OFDM symbols constituting the slot/mini-slot, the base station apparatus 10 may configure different numbers of OFDM symbols for respective subcarrier spacings. The base station apparatus 10 may signal the number of OFDM symbols constituting the slot/mini-slot, and may notify the terminal apparatus 20 of the number by using the RRC message/system information/downlink control information.

In the communication system according to the present embodiment, a prescribed resource allocation unit for mapping of a physical channel is defined. The resource allocation unit is defined as the number of subcarriers and the number of OFDM symbols (the number of SC-FDMA symbols in a case that the DFT-S-OFDM is used). For example, the base station apparatus 10 can notify, in terms of the number of resource allocation units, information related to the resource allocation in the uplink grant and the downlink grant. In a case that the number of subcarriers in the resource allocation unit at each subcarrier spacing is configured to be the same, the frequency bandwidth of the resource allocation unit varies according to the subcarrier spacing. For example, in the resource allocation unit, the frequency bandwidth with f_scs=60 kHz is four times as large as the frequency bandwidth with f_scs=15 kHz.

The number of OFDM symbols in the resource allocation unit can be configured to have different values according to Quality of Service (QoS), Transmission Time Interval (TTI), and application (eMBB, mMTC, or uRLLC). The resource allocation unit can be configured in units of subframes/slots/mini-slots in the time domain. In a case that the resource allocation unit is configured in units of subframes, the number of OFDM symbols constituting the resource allocation unit is 14. The communication system according to the present embodiment may use the slot as a minimum unit to which the base station apparatus 10 and the terminal apparatus 20 map the physical channel (e.g., the physical data shared channel, the physical control channel). In this case, the number of OFDM symbols constituting the resource allocation unit is equal to the number of OFDM symbols constituting the slot. The communication system according to the present embodiment may use the mini-slot as the minimum unit to which the terminal apparatus 20 maps the physical channel (e.g., the physical data shared channel, the physical control channel). In this case, the number of OFDM symbols constituting the resource allocation unit is equal to the number of OFDM symbols constituting the mini-slot.

The base station apparatus 10 can configure the subcarrier spacing for each system band. The base station apparatus 10 may configure the subcarrier spacing used for each of the system bands according to the Quality of Service QoS, TTI, and application (eMBB, mMTC, or uRLLC) of the uplink and the downlink physical channels for the terminal apparatus 20. The TTI is the minimum time unit of scheduling.

The enhanced Mobile Broadband (eMBB) is used for high-capacity communication with high frequency efficiency. The massive Machine Type Communication (mMTC) is used to accommodate a multiplicity of terminals and to transmit small data to each terminal. The Ultra-Reliable and Low Latency Communication (uRLLC) is used for communication with high reliability and low latency.

The communication system according to the present embodiment can also configure the subcarrier spacing for each frequency band used to transmit the physical channel. For example, in a case that two frequency bands are used, the subcarrier spacing in the higher frequency band is configured to be larger than the subcarrier spacing in the lower frequency band. The base station apparatus 10 and the terminal apparatus 20 transmit the physical channel by using the subcarrier spacing based on the frequency band.

Figure 3:
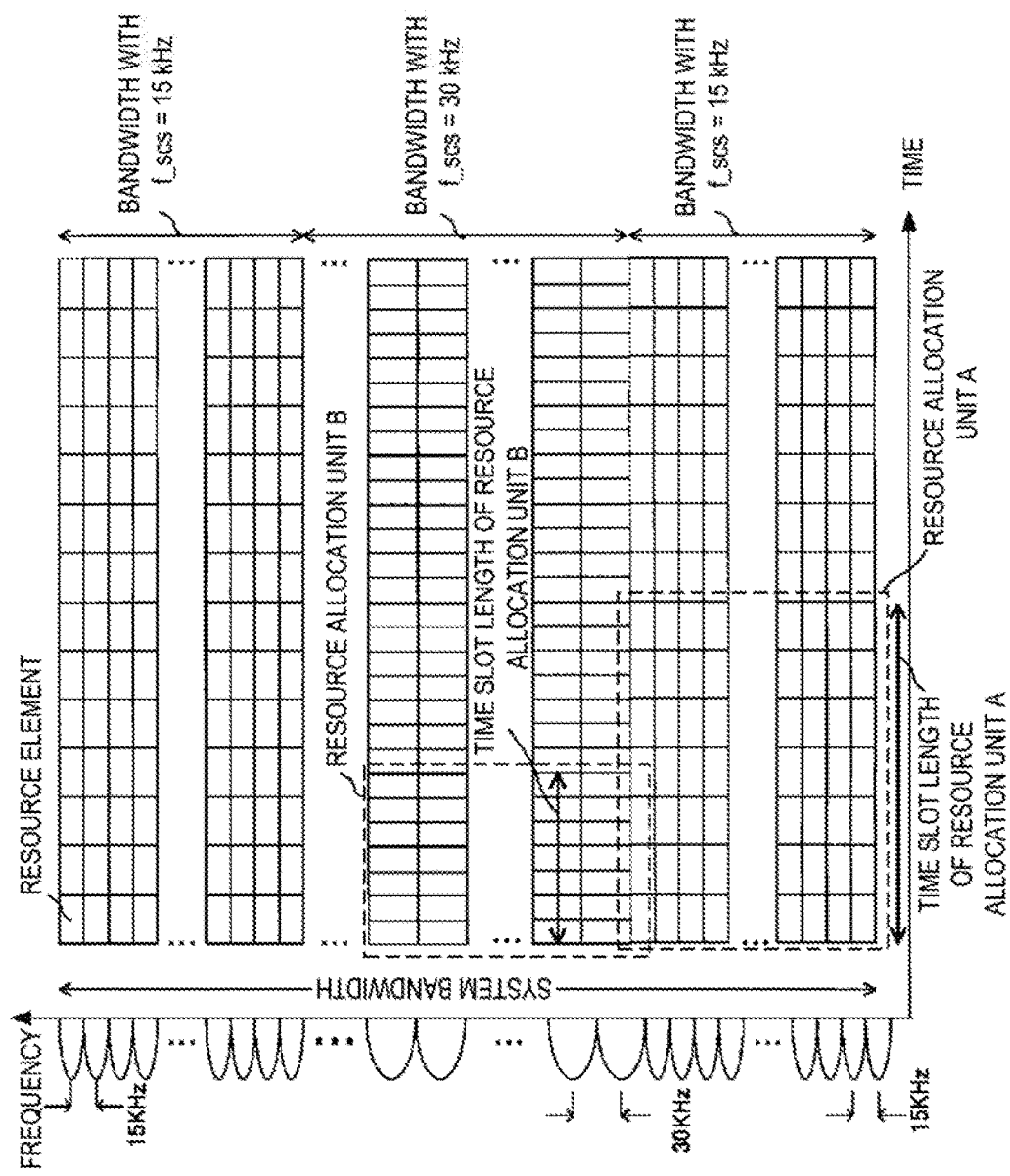
FIG. 3 is a diagram illustrating an example of physical resources for the communication system according to the first embodiment.

The base station apparatus 10 may configure multiple subcarrier spacings in one system band. FIG. 3 is a diagram illustrating an example of physical resources for the communication system according to the present embodiment. FIG. 3 is an example where subcarrier spacings f_scs=15 kHz and 30 kHz are frequency-division-multiplexed (Frequency Division Multiplexing (FDM)) within one system band. FIG. 3 is a case where the subcarrier spacing allocated to both ends of the system band is smaller than the subcarrier spacing allocated to the inner side of the system band. The resource element is a region consisting of one subcarrier and one OFDM symbol (or one SC-FDMA symbol). A resource allocation unit A is a unit to which, in a region having a subcarrier spacing of 15 kHz, the physical channel is mapped. A resource allocation unit B is a unit to which, in a region having a subcarrier spacing of 30 kHz, the physical channel is mapped. The resource allocation unit A and the resource allocation unit B are examples in which the time domain is configured in units of slots (the number of OFDM symbols=7). In this case, a time slot length of the resource allocation unit A is twice as large as a time slot length of the resource allocation unit B. In the region having a subcarrier spacing of 30 kHz, two physical channels can be mapped into a time slot interval of the resource allocation unit A.

The base station apparatus 10 schedules, according to the QoS and application, resources to which the uplink and downlink physical channels for the terminal apparatus 20 are mapped. For example, in FIG. 3, in a case that the terminal apparatus 20 transmits the uplink physical channel for the eMBB application, the base station apparatus 10 allocates, to the terminal apparatus 20, the resource allocation unit A in the region with the subcarrier spacing f_scs=15 kHz. In a case that the terminal apparatus 20 transmits the uplink physical channel for the URLLC application, the base station apparatus 10 allocates, to the terminal apparatus 20, the resource allocation unit B in the region with the subcarrier spacing f_scs=30 kHz.

The base station apparatus 10 may configure the bandwidth with each subcarrier spacing constituting the system band. The base station apparatus 10 notifies the terminal apparatus 20 of the configuration information about the bandwidth with each subcarrier spacing by using the broadcast channel/RRC message/SIB. A dedicated physical channel (subcarrier spacing format index channel) may be defined for notification of the configuration information about the bandwidth with each subcarrier spacing. The configuration information about the bandwidth with each subcarrier spacing can be independently configured for each of the uplink and the downlink. Note that, within one system band, the bandwidth at each subcarrier spacing may be preset in the communication system.

In the uplink/downlink of the communication system illustrated in FIG. 1, multiple subcarrier spacings are used. The base station apparatus 10 transmits a downlink signal to the terminal apparatus 20 by using any of the multiple subcarrier spacings. The terminal apparatus 20 transmits an uplink signal to the base station apparatus 10 by using any of the multiple subcarrier spacings.

The terminal apparatus 20 notifies the base station apparatus 10 of the UE Capability indicating that transmission using multiple subcarrier spacings is supported. The terminal apparatus 20 can notify the base station apparatus 10 of information included in the UE Capability and indicating the supported subcarrier spacings. The base station apparatus 10 notifies the terminal apparatus 20 of the subcarrier spacing used for the physical channels in the uplink and the downlink. The subcarrier spacing is notified using the broadcast channel/RRC message/system information/DCI. For example, the terminal apparatus 20 interprets, as a reference subcarrier spacing, the subcarrier spacing of the resource elements to which the received synchronization signals (PSS/SSS) are mapped. The base station apparatus 10 uses the RRC message/system information to notify multiple candidates for the subcarrier spacing (subcarrier spacing set) that can be used (configured) for the uplink/downlink by the terminal apparatus 20 to the terminal apparatus 20 supporting transmission using multiple subcarrier spacings (transmission of the subcarrier spacing set may be avoided for terminal apparatuses not supporting transmission using multiple subcarrier spacings). For example, in a case that the terminal apparatus receives a downlink subcarrier spacing set={sc15, sc30, sc60, sc120}, the subcarrier spacing set indicates that the downlink signal is likely to be transmitted using the four subcarrier spacings of 15 kHz, 30 kHz, 60 kHz, 120 kHz in the downlink. The subcarrier spacing set is also considered to indicate available candidates for an OFDM symbol length (or an SC-FDMA symbol length). In a case of uplink grant-free multiple access, the terminal apparatus 20 transmits the uplink signal by using one subcarrier spacing selected from the subcarrier spacing set.

In a case of grant-based multiple access, the base station apparatus 10 selects, from the subcarrier spacing set, a subcarrier spacing to be used for each physical downlink shared channel. The base station apparatus 10 notifies the selected one subcarrier spacing by using the downlink control information. The terminal apparatus 20 identifies the subcarrier spacing of the resource to which the physical downlink shared channel is mapped, based on downlink control information including information about the subcarrier spacing. Note that the base station apparatus 10 may transmit the subcarrier spacing set in a cell-specific manner by using the system information. In this case, the terminal apparatus supporting transmission using multiple subcarrier spacings reads the subcarrier spacing set from the system information (the terminal apparatus supporting transmission using multiple subcarrier spacings does not read the subcarrier spacing set).

The communication system according to the present embodiment allows the configuration of the subcarrier spacing to be varied between the uplink and the downlink. For example, the subcarrier spacing used for the ACK/NACK transmission for the physical downlink shared channel can be configured to be different from the subcarrier spacing used to transmit the physical downlink shared channel. The subcarrier spacing set can be configuration information common to the uplink and the downlink. The subcarrier spacing set may be information configured independently for the uplink and for the downlink. The information included in the downlink control information and related to the carrier interval can be, both for the uplink and for the downlink, control information indicating the carrier spacing. The information included in the downlink control information and related to the carrier interval may be control information notified independently for the uplink and for the downlink (the downlink control information includes separate fields respectively indicating an uplink carrier interval and a downlink carrier interval).

Figure 4:
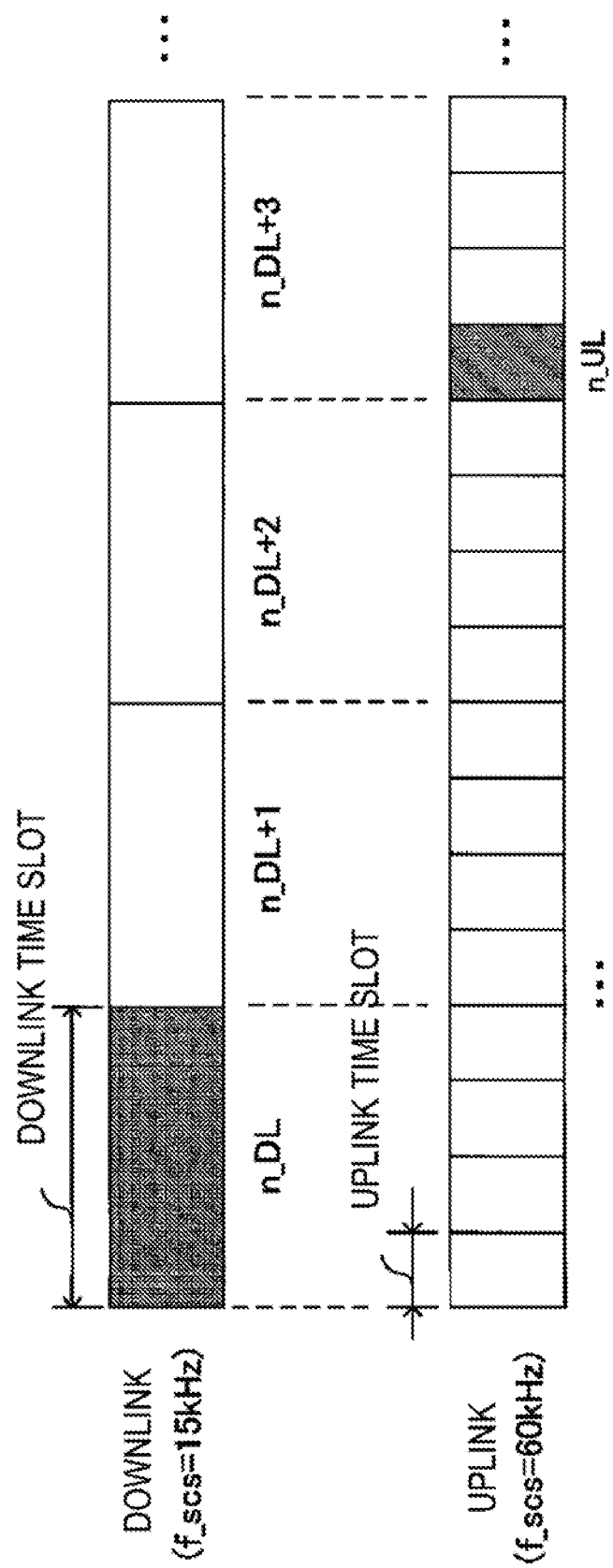
FIG. 4 is a diagram illustrating an example of ACK/NACK transmission timings according to the first embodiment.

FIG. 4 is a diagram illustrating an example of ACK/NACK transmission timings according to the present embodiment. A downlink time slot is a time slot (time domain of the resource allocation unit) to which the physical channel is mapped in the downlink. An uplink time slot is a time slot to which the physical channel is mapped in the uplink. Units of the uplink time slots and the downlink time slots are configured with reference to the slot/mini-slot. One downlink physical channel (e.g., one transport block) is mapped in downlink time slot unit. One uplink physical channel is mapped in uplink time slot unit. FIG. 4 is an example in which the downlink subcarrier spacing is configured to be 15 kHz and the uplink subcarrier spacing is configured to be 60 kHz. In other words, a downlink time slot length is longer than an uplink time slot length. $n_{DL}$ is a downlink time slot to which the physical downlink shared channel is mapped.

In FIG. 4, with reference to (using, as units) the time slots with the subcarrier spacing used for the downlink data transmission, the base station apparatus 10 configures a latency time k for the reception of ACK/NACK to the data. With reference to the time slots with the subcarrier spacing used for the downlink data transmission, the terminal apparatus 20 counts the latency time k for the transmission of ACK/NACK to the data. $n_{UL}$ is uplink time slots in which the ACK/NACK is transmitted. Note that the time slot at the subcarrier spacing used for the downlink data transmission is interchangeable with the length of OFDM symbol length used for the downlink data transmission.

It is assumed that the physical downlink shared channel has been transmitted in a time slot $n_{DL}$ (shaded portion). In this case, the ACK/NACK for the physical downlink shared channel is transmitted within the range of $n_{DL}$+k time slots. FIG. 4 is an example of k=3 (upward-sloping diagonal portion). The base station apparatus 10 uses the RRC message/DCI to notify the terminal apparatus 20 of the latency time k (slot timing k) when the ACK/NACK is transmitted. The base station apparatus can configure the latency time k at each subcarrier spacing. The base station apparatus can configure the latency time k for each of the uplink and downlink. Note that FIG. 4 is an example in which the ACK/NACK is transmitted in a leading uplink time slot included in an $n_{DL}$+3 interval but that a trailing or any other uplink time slot in the $n_{DL}$+3 interval may be used for the transmission. For example, which of the uplink time slots in the $n_{DL}$+3 interval is used to transmit the ACK/NACK may be associated with the UE ID, a transmit antenna port number, a downlink resource allocation position, or the like. Thus, the uplink time slot in which the ACK/NACK is transmitted can be randomized. In addition, in time division multiplexing using the same frequency in the downlink and in the uplink, the latency time k when the ACK/NACK for the data is transmitted may be similarly counted with reference to the time slot at the subcarrier spacing used for the downlink data transmission. In this case, the time slot at the latency time k cannot always be used in the uplink, and thus, the ACK/NACK may be transmitted in an uplink time slot that is available at the earliest timing at or after the latency time k.

Figure 5:
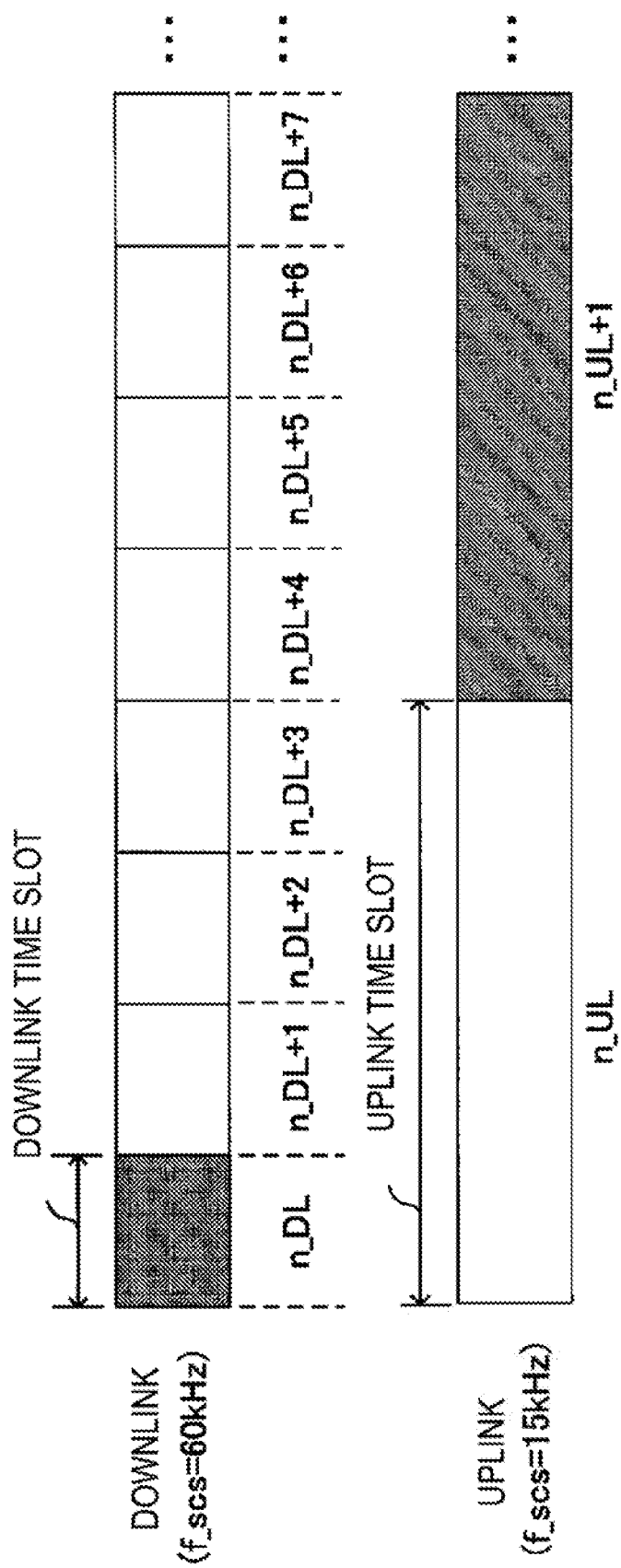
FIG. 5 is a diagram illustrating another example of ACK/NACK transmission timings according to the first embodiment.

FIG. 5 is a diagram illustrating another example of the ACK/NACK transmission timing according to the present embodiment. FIG. 5 is an example in which the downlink subcarrier spacing is configured to be 60 kHz and in which the uplink subcarrier spacing is configured to be 15 kHz. In other words, the downlink time slot length is smaller than the uplink time slot length. In FIG. 5, the ACK/NACK transmission timing for the physical downlink shared channel (shaded portion) is configured as the interval of a downlink time slot $n_{DL}$+k. FIG. 5 is an example in which the latency time when the ACK/NACK is received is configured as k=3. The interval of a downlink time slot $n_{DL}$+3 is within the interval of the same uplink time slot as the time slot $n_{DL}$ in which the physical downlink shared channel is transmitted (in the interval of an uplink time slot $n_{UL}$). This precludes the ACK/NACK from being transmitted within the interval of the downlink time slot $n_{DL}$+3. In this case, the ACK/NACK is transmitted (upward-sloping diagonal portion) in a next uplink time slot $n_{UL}$+1 to the uplink time slot $n_{UL}$. Thus, in a case that the ACK/NACK fails to be transmitted in the uplink time slot $n_{UL}$ corresponding to the interval of the time slot $n_{DL}$+k, the ACK/NACK is transmitted at a predetermined timing after the uplink time slot $n_{UL}$. Note that in the example of FIG. 5, in a case of k<4, the ACK/NACK is similarly transmitted in the uplink time slot $n_{UL}$+1.

On the other hand, in a case that the time slot $n_{DL}$ in which the physical downlink shared channel is transmitted is not included in the interval of the uplink time slot $n_{UL}$ in which the ACK/NACK is transmitted (in FIG. 5, in a case of k>3), in other words, in a case that the interval of the downlink time slot $n_{DL}$+k is within the interval of an uplink time slot interval different from the time slot $n_{DL}$ in which the physical downlink shared channel is transmitted, the ACK/NACK is transmitted in the uplink time slot $n_{UL}$. Note that FIG. 4 and FIG. 5 are examples in which the latency time for the transmission of ACK/NACK to the downlink data is counted but are also applicable to the latency time for the transmission of ACK/NACK to uplink data.

FIGS. 6A and 6B are diagrams illustrating another example of the ACK/NACK transmission timing according to the present embodiment. FIG. 6A illustrates an example in which the downlink subcarrier spacing is configured to be 15 kHz and the uplink subcarrier spacing is configured to be 60 kHz. FIG. 6B is an example in which the downlink subcarrier spacing is configured to be 60 kHz and the uplink subcarrier spacing is configured to be 15 kHz. $n_{DL}$ is a downlink time slot in which the physical downlink shared channel is transmitted (shaded portion). $n_{UL}$ is an uplink time slot in which the ACK/NACK for the physical downlink shared channel is transmitted (upward-sloping diagonal portion).

In FIGS. 6A and 6B, the base station apparatus 10 configures the latency time k when the ACK/NACK is received, with reference to (using, as units) the time slots at the subcarrier spacing used for the ACK/NACK transmission. The terminal apparatus 20 counts the latency time k when the ACK/NACK is transmitted, with reference to the time slot at the subcarrier spacing used for the ACK/NACK transmission. Note that the time slot at the subcarrier spacing used for the ACK/NACK transmission is interchangeable with the length of the OFDM symbol length used to transmit the ACK/NACK.

The time slot $n_{\_UL}$ in which the ACK/NACK for the physical downlink shared channel is transmitted is the k-th uplink time slot from the uplink time slot ($n_{\_UL}$-k) including the end point of the $n_{\_DL}$ (the $n_{\_UL}$-k-th uplink time slot interval overlaps with the downlink slot $n_{\_DL}$). FIGS. 6A and 6B are examples of a case of k=3. Note that FIGS. 6A and 6B are examples in which the latency time for the transmission of ACK/NACK to the downlink data is counted but are also applicable to the latency time for the transmission of ACK/NACK to uplink data.

FIGS. 7A and 7B are diagrams illustrating another example of the ACK/NACK transmission timing according to the present embodiment. FIG. 7A is an example in which the downlink subcarrier spacing is configured to be 15 kHz and in which the uplink subcarrier spacing is configured to be 60 kHz. FIG. 7B is an example in which the downlink subcarrier spacing is configured to be 60 kHz and in which the uplink subcarrier spacing is configured to be 15 kHz. $n_{\_DL}$ is a downlink time slot in which the physical downlink shared channel is transmitted (shaded portion). $n_{\_UL}$ is an uplink time slot in which the ACK/NACK for the physical downlink shared channel is transmitted (upward-sloping diagonal portion).

In FIGS. 7A and 7B, the base station apparatus 10 configures the latency time k when the ACK/NACK is received, with reference to (using, as a unit) one of the uplink and downlink time slots having a larger subcarrier spacing (smaller OFDM symbol length). The terminal apparatus 20 counts the latency time k when the ACK/NACK is transmitted, with reference to the one of the uplink and downlink time slots having a larger subcarrier spacing. FIGS. 7A and 7B are examples of k=3.

In FIG. 7A, the uplink subcarrier spacing is larger than the downlink subcarrier spacing. In this case, the latency time k is configured with reference to the uplink time slot. The time slot $n_{\_UL}$ in which the ACK/NACK for the physical downlink shared channel is transmitted is the k-th uplink time slot with reference to an uplink time slot $n_{\_UL}$-k (in FIG. 7B, k=3) overlapping with the time slot $n_{\_DL}$. In other words, the time slot $n_{\_UL}$ in which the ACK/NACK for the physical downlink shared channel is transmitted is the kth uplink time slot with reference to the end point of the $n_{\_DL}$.

In FIG. 7B, the downlink subcarrier spacing is larger than the uplink subcarrier spacing. In this case, the latency time k is configured with reference to the downlink time slot. In FIG. 7B, as is the case with FIG. 5, the interval of the downlink time slot $n_{\_DL}$+k (k=3) is within the same uplink time slot interval as the time slot $n_{\_DL}$ in which the physical downlink shared channel is transmitted (uplink time slot $n_{\_UL}$), and thus, the ACK/NACK is transmitted in a next uplink time slot $n_{\_UL}$+1 to the uplink time slot $n_{\_UL}$ (upward-sloping diagonal portion). Note that in a case that the time slot $n_{\_DL}$ in which the physical downlink shared channel is transmitted is not included in the interval of the uplink time slot $n_{\_UL}$ in which the ACK/NACK is transmitted (in FIGS. 7A and 7B, in a case of k>3), the ACK/NACK is transmitted in the uplink time slot $n_{\_UL}$. Note that FIGS. 7A and 7B are examples in which the latency time for the transmission of ACK/NACK to the downlink data is counted but are also applicable to the latency time for the transmission of ACK/NACK to uplink data.

Figures 8A, 8B:
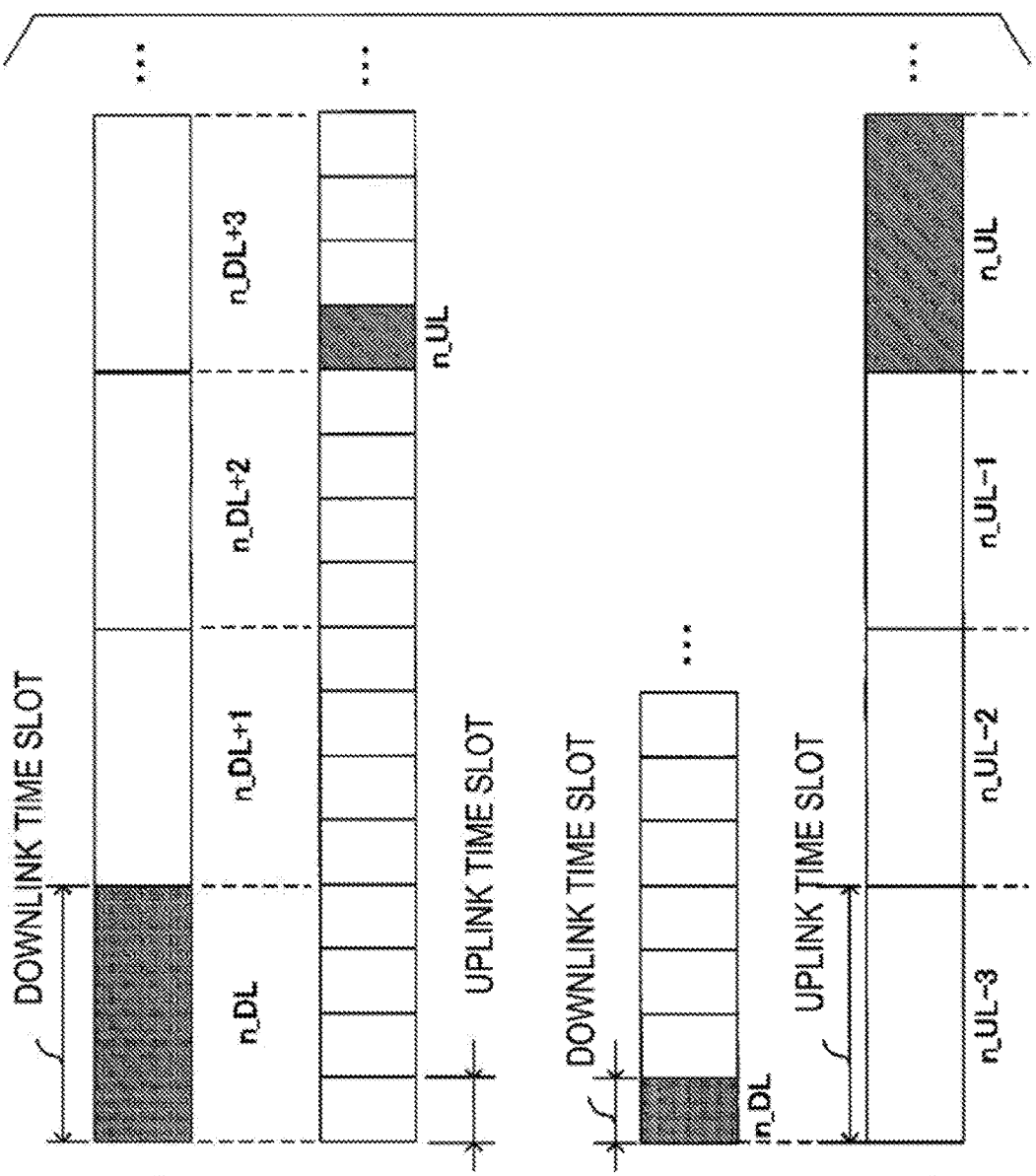
FIGS. 8A and 8B are diagrams illustrating another example of ACK/NACK transmission timings according to the first embodiment.

FIGS. 8A and 8B are diagrams illustrating another example of the ACK/NACK transmission timing according to the present embodiment. FIG. 8A is an example in which the downlink subcarrier spacing is configured to be 15 kHz and in which the uplink subcarrier spacing is configured to be 60 kHz. FIG. 8B is an example in which the downlink subcarrier spacing is configured to be 60 kHz and in which the uplink subcarrier spacing is configured to be 15 kHz. $n_{\_DL}$ is a downlink time slot in which the physical downlink shared channel is transmitted (shaded portion). $n_{\_UL}$ is an uplink time slot in which the ACK/NACK for the physical downlink shared channel is transmitted (upward-sloping diagonal portion).

In FIGS. 8A and 8B, the base station apparatus 10 configures the latency time k when the ACK/NACK is received, with reference to (using, as a unit) one of the uplink and downlink time slots having a smaller subcarrier spacing (larger OFDM symbol length). The terminal apparatus 20 counts the latency time k when the ACK/NACK is transmitted, with reference to the one of the uplink and downlink time slots having a smaller subcarrier spacing. FIGS. 7A and 7B illustrate an example of k=3.

In FIG. 8A, the downlink subcarrier spacing is smaller than the uplink subcarrier spacing. In this case, the latency time k is configured with reference to the downlink time slot. The ACK/NACK for the physical downlink shared channel is transmitted within the range of $n_{\_DL}$+k time slots. FIGS. 8A and 8B are examples in which the ACK/NACK is transmitted in the leading uplink time slot $n_{\_UL}$ included in the $n_{\_DL}$+3 interval. However, as is the case with FIG. 4, the trailing or any other uplink time slot in the $n_{\_DL}$+3 interval may be used for the transmission.

In FIG. 8B, the uplink subcarrier spacing is smaller than the downlink subcarrier spacing. In this case, the latency time k is configured with reference to the uplink time slot. The time slot $n_{\_UL}$ in which the ACK/NACK for the physical downlink shared channel is transmitted is the k-th uplink time slot with reference to the uplink time slot $n_{\_UL}$-k (in FIG. 8(B), k=3) overlapping with the time slot $n_{\_DL}$. Note that FIGS. 8A and 8B examples in which the latency time for the transmission of ACK/NACK to the downlink data is counted but are also applicable to the latency time for the transmission of ACK/NACK to uplink data.

The base station apparatus 10 uses the RRC message/system information/downlink control information to notify the subcarrier spacing used for the uplink and downlink transmission. The terminal apparatus 20 identifies, based on the subcarrier spacing, the subcarrier spacings of the resources to which the uplink and downlink physical channels are mapped. Alternatively, the terminal apparatus 20 may identify the subcarrier spacing of the resources to which the uplink and downlink physical channels are mapped based on the subcarrier spacing of the synchronization signals (a combination of some of or all of the Primary Synchronization Signal, the Secondary Synchronization Signal, and the Tertiary Synchronization Signal). The terminal apparatus 20 can identify, from the subcarrier spacing, units of uplink time slots and downlink time slots. In FIG. 4 to FIGS. 8A and 8B, the terminal apparatus 20 interprets, based on a result of identification of the subcarrier spacing, the time slot reference used for counting the latency time k when the ACK/NACK is transmitted. The base station apparatus 10 uses the subcarrier spacing notified using the RRC message/system information/downlink control information, to implicitly indicate the time slot reference used for counting the latency time k when the ACK/NACK is transmitted.

The base station apparatus 10 can notify the OFDM symbol length (SC-FDMA symbol length) used for the uplink and downlink transmission, using the RRC message/system information/downlink control information. The terminal apparatus 20 may identify, from the OFDM symbol length, units of uplink time slots and downlink time slots.

The base station apparatus 10 can also implicitly indicate the time slot reference used for counting the latency time k when the ACK/NACK is transmitted, using the OFDM symbol length notified using the RRC message/system information/downlink control information. Note that the base station apparatus 10 can also explicitly notify the time slot reference used for counting the latency times k when the ACK/NACK is transmitted, using the RRC message/system information/downlink control information.

Figure 9:
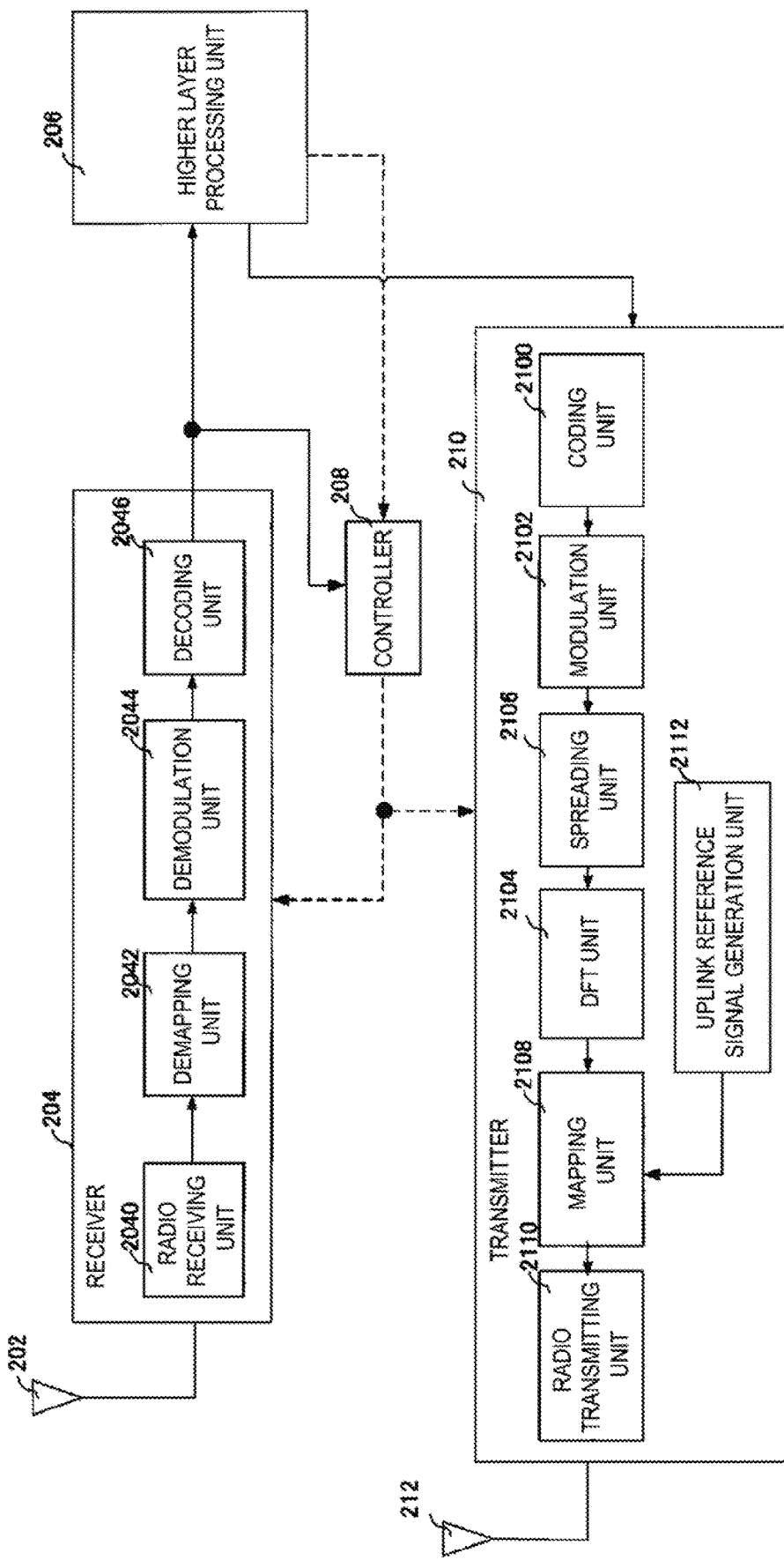
FIG. 9 is a schematic block diagram illustrating a configuration of a terminal apparatus according to the first embodiment.

FIG. 9 is a schematic block diagram illustrating a configuration of the terminal apparatus 20 according to the present embodiment. The terminal apparatus 20 includes a receive antenna 202, a receiver (receiving step) 204, a higher layer processing unit (higher layer processing step) 206, a controller (control step) 208, a transmitter (transmitting step) 210, and a transmit antenna 212. The receiver 204 includes a radio receiving unit (radio receiving step) 2040, a demapping unit (demultiplexing step) 2042, a demodulation unit (demodulating step) 2044, and a decoding unit (decoding step) 2046. The transmitter 210 includes a coding unit (coding step) 2100, a modulation unit (modulating step) 2102, a DFT unit (DFT step) 2104, a spreading unit (spreading step) 2106, a mapping unit (mapping step) 2108, a radio transmitting unit (radio transmitting step) 2110, and an uplink reference signal generation unit (uplink reference signal generating step) 2112.

The receiver 204 receives the downlink signals (downlink physical channel, downlink physical signal) transmitted by the base station apparatus 10 via the receive antenna 202, and separates, demodulates, and decodes the downlink signals. The receiver 204 demodulates and decodes the physical downlink control channel separated from the downlink signal, and then outputs the resultant physical downlink control channel to the controller 208. The receiver 204 outputs the decoding result for the downlink physical channel to the higher layer processing unit 206.

The radio receiving unit 2040 converts, by down-converting, a downlink signal received through the receive antenna 202 into a baseband signal, removes unnecessary frequency components, controls the amplification level in such a manner as to suitably maintain a signal level, performs orthogonal demodulation (orthogonal detection) based on an in-phase component and an orthogonal component of the received signal, and converts the resulting orthogonally-demodulated analog signal into a digital signal. The radio receiving unit 2040 removes a portion corresponding to a Cyclic Prefix (CP) from the digital signal resulting from the conversion, performs fast Fourier transform (demodulating processing for OFDM modulation) on the downlink signal from which the CP has been removed, and extracts a frequency domain signal.

The demapping unit 2042 separates and extracts the downlink physical channels (physical downlink control channel, physical downlink shared channel, physical broadcast channel, subcarrier spacing format indicator channel, and the like), the downlink reference signal, synchronization signal, and the like, included in the extracted frequency domain downlink signal. The demapping unit 2042 includes a channel measurement function (channel measurement unit) that uses a downlink reference signal. The demapping unit 2042 includes a channel compensation function (channel compensation unit) for a downlink signal using the channel measurement result. The demapping unit outputs the downlink physical channels to the demodulation unit 2044.

The demodulation unit 2044 performs demodulation processing on each of the modulation symbols of each downlink physical channel using a modulation scheme such as BPSK, QPSK, 16QAM, 64QAM, or 256QAM that is predetermined or notified in advance using the downlink grant.

The decoding unit 2046 performs decoding processing on coded bits of each of the demodulated downlink physical channels at a coding rate of a predetermined coding scheme which rate is predetermined or notified in advance using the downlink grant. The decoding result for the downlink physical channel is output to the higher layer processing unit 206 and the controller 208.

The controller 208 acquires, from the receiver 204/higher layer processing unit 206, broadcast information/system information/RRC message and the like included in the physical broadcast channel/physical downlink shared channel and the like. The broadcast information/system information/RRC message and the like can include the uplink and downlink subcarrier spacing sets/bandwidth information for each subcarrier spacing/configuration information about a time domain unit (slot, mini-slot, or subframe) of the resource allocation unit/latency time k/configuration information such as the OFDM symbol length related to the downlink transmission and the uplink transmission. The configuration information related to the downlink transmission is information related to the configuration of the downlink signal to be transmitted to the terminal apparatus by the base station apparatus. The configuration information related to the uplink transmission is information related to the configuration of the uplink signal to be transmitted to the base station apparatus by the terminal apparatus. The subcarrier spacing sets/bandwidth information for each subcarrier spacing/configuration information about a time domain unit of the resource allocation unit/latency time k/OFDM symbol length and the like can be information configured independently for the uplink and for the downlink.

The controller 208 acquires, from the receiver 204, downlink control information included in the physical downlink control channel. The downlink control information includes control information related to the downlink transmission and control information related to the uplink transmission. The control information related to the downlink transmission is information related to the configuration of the downlink signal to be transmitted to the terminal apparatus by the base station apparatus. The control information related to the uplink transmission is information related to the configuration of the uplink signal to be transmitted by the terminal apparatus to the base station apparatus. The control information related to the downlink transmission includes information related to the subcarrier spacing of the resource to which the physical downlink shared channel is mapped/allocation of the resource to which the physical downlink shared channel is mapped/MCS for the physical downlink shared channel and the like.

The control information related to the uplink transmission can include information related to the subcarrier spacing of the resource to which the uplink physical channel is mapped/allocation of the resource to which the uplink physical channel is mapped/MCS for the uplink physical channel/latency time k for transmission of the ACK/NACK and the like. The controller 208 controls each block included in the receiver 204 by using the control information related to downlink data transmission included in the downlink control information/configuration information related to downlink reception. The controller 208 controls each block included in the transmitter 210 by using the control information related to the uplink transmission included in the downlink control information/the configuration information related to the uplink transmission.

For example, the controller 208 acquires the downlink subcarrier spacing and the uplink subcarrier spacing, based on the subcarrier spacing set acquired using the RRC message and information acquired using the downlink control information and related to the subcarrier spacing. Then, the controller 208 compares the downlink and uplink subcarrier spacings based on the references in FIG. 4 to FIGS. 8A and 8B. Based on the comparison results, the controller 208 interprets the time slot reference in which the physical uplink control channel including the ACK/NACK is transmitted, and inputs the time slot reference to the mapping unit.

The controller 208 may use the downlink and uplink OFDM symbol lengths to interpret the time slot reference in which the physical uplink control channel including the ACK/NACK is transmitted, and input the time slot reference to the mapping unit. In this case, the controller 208 uses the OFDM symbol length acquired using the RRC message/downlink control information to compare the downlink and uplink OFDM symbol lengths based on the references in FIG. 4 to FIGS. 8A and 8B.

The time slot reference in which the physical uplink control channel including the ACK/NACK is transmitted may be any of the references in FIG. 4 to FIGS. 8A and 8B indicated by the base station apparatus 10. In addition, the time slot reference in which the physical uplink control channel including the ACK/NACK is transmitted may be predetermined in the communication system. Note that, in a case that the transmitter 210 transmits the physical uplink control channel, the controller 208 generates Uplink Control Information (UCI) and outputs the generated information to the transmitter 210. Note that some of the functions of the controller 208 can be included in the higher layer processing unit 206.

The higher layer processing unit 206 performs processing for the Medium Access Control (MAC) layer, the Packet Data Convergence Protocol (PDCP) layer, the Radio Link Control (RLC) layer, and the Radio Resource Control (RRC) layer. The higher layer processing unit 206 outputs, to the transmitter 210, information (UE capability) related to terminal apparatus functions supported by the terminal apparatus. For example, the higher layer processing unit 206 signals, in the RRC layer, the information (UE Capability) related to the functions of the terminal apparatus.

The information related to the functions of the terminal apparatus includes information indicating whether the terminal apparatus supports a prescribed function, or information indicating that the terminal apparatus has completed the introduction and testing of the prescribed function. Whether the prescribed function is supported includes whether the introduction and testing of the prescribed function have been completed. In a case that the terminal apparatus supports the prescribed function, the terminal apparatus transmits information (parameters) indicating whether the prescribed function is supported. In a case that the terminal apparatus does not support the prescribed function, the terminal apparatus need not transmit the information (parameters) indicating whether the prescribed function is supported. In other words, whether the prescribed function is supported is reported by whether information (parameters) for indicating whether the prescribed function is supported is transmitted. Information (parameters) for indicating whether a prescribed function is supported may be reported by using one bit of 1 or 0.

For example, the information related to the functions of the terminal apparatus includes information indicating supported subcarrier spacings (including a subcarrier spacing set)/information related to supported frequency bands. The information indicating the supported subcarrier spacings can be associated with the information related to the supported frequency bands. For example, the base station apparatus 10 can identify the supported subcarrier spacings using the information transmitted by the terminal apparatus 20 and related to the frequency bands.

The higher layer processing unit 206 manages various types of configuration information about the terminal apparatus itself. The higher layer processing unit 206 inputs the various types of configuration information to the controller 208/transmitter 210. The higher layer processing unit 206 inputs, to the controller 208, configuration information related to the uplink transmission/configuration information related to the downlink transmission, both types of configuration information being acquired from the downlink physical channel. The higher layer processing unit 206 uses the configuration information related to the uplink transmission/the configuration information related to the downlink transmission to calculate configuration parameters for controlling each block of the receiver 204/transmitter 210, and inputs the calculated configuration parameters to the controller 208. The higher layer processing unit 206 generates configuration information (the UE Capability, a Buffer Status Report (BSR), a power headroom report, and the like) to be notified to the base station apparatus 10, and inputs the generated information to the transmitter 210.

The higher layer processing unit 206 outputs, to the transmitter 210, uplink data (e.g., the DL-SCH) generated by a user operation or the like. The higher layer processing unit 206 can also output, to the transmitter 210, uplink data generated without any user operation (for example, data acquired by a sensor). The uplink data may include a field in which the UE ID is stored. The higher layer processing unit 206 adds the CRC to the uplink data. Parity bits for the CRC are generated using the uplink data. The parity bits for the CRC are scrambled with the UE ID allocated to the terminal apparatus itself (the scrambling is also referred to as an exclusive logical sum operation, masking, or encryption).

In a case that uplink data occurs in the grant-based multiple access, the transmitter 210 generates information used to make a Scheduling Request (SR) to the base station apparatus 10 or to request the base station apparatus 10 to allocate uplink resources such as the BSR. The transmitter 210 transmits the physical uplink shared channel and the physical link control channel, based on the control information related to the uplink transmission/configuration information related to the uplink transmission, both types of configuration information being included in the downlink control information. In a case that uplink data occurs in the grant free multiple access, the transmitter 210 transmits the physical uplink shared channel without receiving the uplink grant. The transmitter 210 transmits the physical uplink shared channel in accordance with information input from the controller 208 and related to the subcarrier spacing.

The coding unit 2100 uses a coding scheme that is predetermined/configured by the controller 208 to code the uplink control information including the uplink data, the ACK/NACK, and the like input from the higher layer processing unit 206 (the coding includes repetitions). Examples of the applicable coding scheme include convolutional coding, turbo coding, Low Density Parity Check (LDPC) coding, and Polar coding. For the coding, in addition to a coding rate of $1/3$, a mother code such as a low coding rate of $1/6$ or $1/12$ may be used. The modulation unit 2102 modulates the coded bits input from the coding unit 2100, in compliance with a modulation scheme such as BPSK, QPSK, 16QAM, 64QAM, or 256QAM (which may include π/2 shift BPSK or π/2 shift QPSK) that is notified using the downlink control information or that is predetermined for each channel.

In a case that a configuration for a spreading code sequence is input from the controller 208, the spreading unit 2106 multiplies a sequence output from the modulation unit 2102, by the spreading code sequence in accordance with the configuration. For example, in a case that a spreading code is configured for a signature resource in the grant free multiple access, the spreading unit 2106 performs spreading processed based on the configuration. In a case that interleaving is configured as a signature resource, the spreading unit 2106 can be replaced with an interleave unit. The interleave unit performs interleave processing on a sequence output from the DFT unit in accordance with a configuration for an interleave pattern input from the controller 208. Even in a case that any other signature resources are applied, similar replacement can be performed. Note that the spreading processing may be performed on a sequence resulting from the DFT processing.

The DFT unit 2104 rearranges, in parallel, modulation symbols, resulting from the spreading, that are output from the spreading processing unit 2106, and then performs Discrete Fourier Transform (DFT) on the rearranged modulation symbols. Here, by adding a sequence of zero symbols to the modulation symbols and then performing the DFT, a signal waveform is obtained that includes zero intervals instead of CPs in a time signal resulting from IFFT. Additionally, by adding a specific sequence such as a Gold sequence or a Zadoff-Chu sequence to the modulation symbols and then performing the DFT, a signal waveform may be obtained that includes a specific pattern in place of CPs in a time signal resulting from the IFFT. However, in a case that the signal waveform corresponds to the OFDM, the DFT is not applied.

The uplink reference signal generation unit 2112 generates a demodulation reference signal in accordance with the configuration information about the demodulation reference signal input from the controller 208. The configuration information about the demodulation reference signal includes a physical cell identity (PCI, Cell ID, or the like) for identification of the base station apparatus 10, the number of subcarriers (bandwidth) to which the uplink reference signal is mapped, the number of OFDM symbols, the cyclic shift, the OCC sequence, and the like. The configuration information about the demodulation reference signal is acquired from the control information related to the uplink transmission/the configuration information related to the uplink transmission.

The mapping unit 2108 maps (time/frequency/spatial multiplexing) the uplink physical channel (output signal from the DFT unit 2104) and the uplink reference signal to resource elements in accordance with the resource allocation/information related to the subcarrier spacing/latency time k included in the control information related to the uplink transmission. For example, the mapping unit 2108 maps the physical uplink control channel including ACK/NACK to the uplink time slot $n_{UL}$, based on the time slot reference interpreted from the information related to the subcarrier spacing.

The radio transmitting unit 2110 performs Inverse Fast Fourier Transform (IFFT) on the multiplexed signal to perform DFT-s-OFDM-type modulation, thus generating SC-FDMA symbols. The radio transmitting unit 2110 performs the inverse fast Fourier transform in accordance with the configuration for the subcarrier spacing. For example, in a case that an IFFT point number of 2048 is used at the subcarrier spacing f_scs=15 kHz, the radio transmitting unit 2110 uses an IFFT point number of 512 at the subcarrier spacing f_scs=60 kHz. Note that it is only required that the inverse fast Fourier transform results in SC-FDMA symbols with multiple subcarrier spacings and that the present embodiment is not limited by the generation method.

The radio transmitting unit 2110 adds CPs to the SC-FDMA symbols to generate a baseband digital signal. Furthermore, the radio transmitting unit 2110 converts the baseband digital signal into an analog signal, removes unnecessary frequency components, converts the resultant signal into a carrier frequency by up-converting, amplifies power, and transmits a DFT-S-OFDM signal to the base station apparatus 10 via the transmit antenna 212. The radio transmitting unit 2110 performs the power amplification in accordance with the configuration for the terminal apparatus transmit power included in the control information related to the uplink transmission.

Figure 10:
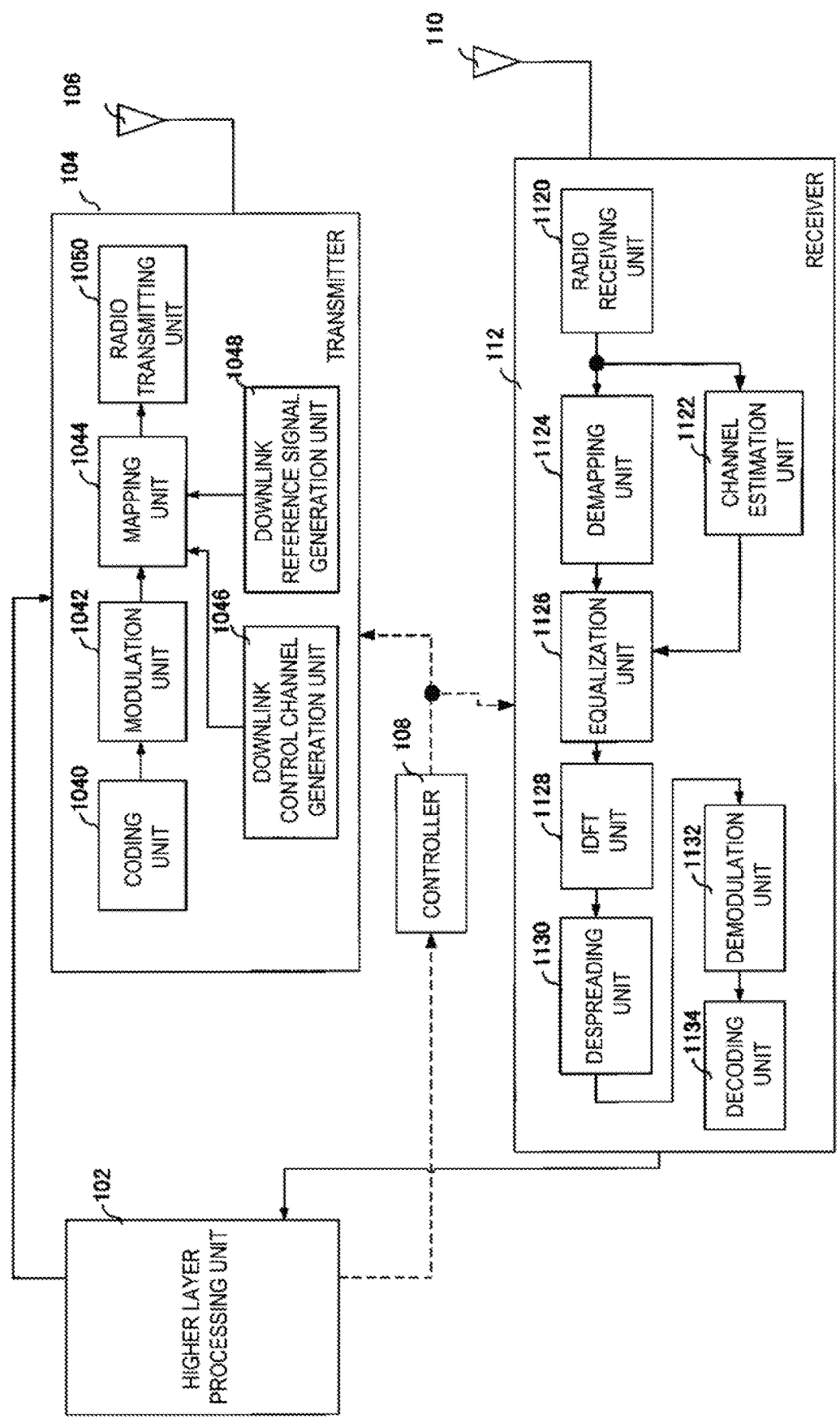
FIG. 10 is a schematic block diagram illustrating a configuration of a base station apparatus according to the first embodiment.

FIG. 10 is a schematic block diagram illustrating a configuration of the base station apparatus 10 according to the present embodiment. The base station apparatus 10 includes a higher layer processing unit (higher layer processing step) 102, a transmitter (transmitting step) 104, a transmit antenna 106, a controller (control step) 108, a receive antenna 110, and a receiver (receiving step) 112. The transmitter 104 includes a coding unit (coding step) 1040, a modulation unit (modulating step) 1042, a mapping unit (mapping step) 1044, a downlink control channel generation unit (downlink channel signal generating step) 1046, a downlink reference signal generation unit (downlink reference signal generating step) 1048, and a radio transmitting unit (radio transmitting step) 1050. The receiver 112 includes a radio receiving unit (radio receiving step) 1120, a channel estimation unit (channel estimating step) 1122, a demapping unit (demapping step) 1124, and an equalization unit 1126 (equalizing step), an IDFT unit 1128 (IDFT step), a despreading unit 1130 (despreading step), a demodulation unit 1132 (demodulating step), and a decoding unit 1134 (decoding step).

The higher layer processing unit 102 performs processing for layers higher than the physical layer such as the Medium Access Control (MAC) layer, the Packet Data Convergence Protocol (PDCP) layer, the Radio Link Control (RLC) layer, and the Radio Resource Control (RRC) layer. The higher layer processing unit 102 generates information necessary for control of the transmitter 104 and the receiver 112, and outputs the generated information to the controller 108. The higher layer processing unit 102 outputs the downlink data (e.g., the DL-SCH), the broadcast information (e.g., the BCH), the system information, the RRC message, and the like to the transmitter 104.

The higher layer processing unit 102 receives information about the terminal apparatus such as the functions of the terminal apparatus (UE capability), from the terminal apparatus 20 (via the receiver 112). The functions of the terminal apparatus include information indicating supported subcarrier spacings and the like. The higher layer processing unit 102 receives, from the terminal apparatus 20, higher layer signaling such as the BSR, the power headroom report, and the like.

The higher layer processing unit 102 generates system information (MIB, SIB) to be broadcasted or acquires the system information from a higher node. The higher layer processing unit 102 outputs, to the transmitter 104, the system information to be broadcasted. Note that a part of the SIB can be transmitted uniquely to the terminal apparatus.

The higher layer processing unit 102 generates downlink data (transport block), system information (SIB), an RRC message, a MAC CE, and the like to be mapped to the physical downlink shared channel, or acquires such data from a higher node, and outputs such data to the transmitter 104. The higher layer processing unit 102 can include, in these higher layer signals, a part or all of the configuration information related to the uplink transmission/the configuration information for the downlink transmission. The higher layer processing unit 102 outputs these types of configuration information to the controller 108/transmitter 104. The configuration information related to the uplink transmission/the configuration information related to the downlink transmission can include information related to the uplink and downlink subcarrier spacings/allocated bandwidth information for each subcarrier spacing.

The higher layer processing unit 102 determines a subcarrier spacing set available to the terminal apparatus 20. The higher layer processing unit 102 determines the coding rate for the physical channel (physical downlink shared channel, physical uplink shared channel, or the like), the modulation scheme (or the MCS), the subcarrier spacing, the uplink time slot (latency time k) for the ACK/NACK, the transmit power, and the like. The higher layer processing unit 102 outputs the coding rate, the modulation scheme, the subcarrier spacing, the uplink time slot for the ACK/NACK, and transmit power to the transmitter 104/controller 108/receiver 112. The higher layer processing unit 102 configures a time domain unit (subframe/slot/mini-slot) of subcarrier spacing and resource allocation unit used for the uplink and downlink transmission, according to the application of the physical channel (eMBB, mMTC, or uRLLC)/frequency fluctuation in channel/time fluctuation/frequency band used. The higher layer processing unit 102 can configure a time domain unit of the resource allocation unit to be the same for the uplink and for the downlink.

Based on the various types of configuration information input from the higher layer processing unit 102, the controller 108 controls the transmitter 104 and the receiver 112. The controller 108 schedules the uplink data based on the BSR, the power headroom report, and the like. The controller 108 generates contents of the uplink grant to be transmitted to the terminal apparatus 20 (the resource allocation for the uplink data for each terminal apparatus, the subcarrier spacing, the uplink time slot for the ACK/NACK, the MCS, and the like). The controller 108 controls the receiver 112, based on the contents of the uplink grant. The controller 108 generates downlink control information, based on the configuration information related to the downlink transmission and the configuration information related to the uplink transmission, both types of configuration information being input from the higher layer processing unit 102, and outputs the generated information to the transmitter 104. The downlink control information may include control information related to the uplink and downlink subcarrier spacings. Note that the functions of the controller 108 can be included in the higher layer processing unit 102.

The transmitter 104 codes and modulates, for the terminal apparatus 20, the broadcast information, the downlink control information, the downlink shared channels, and the like input from the higher layer processing unit 102, and generates a physical broadcast channel, a physical downlink control channel, and a physical downlink shared channel. The coding unit 1040 uses a coding scheme that is predetermined/determined by the higher layer processing unit 102 to code the broadcast information and the downlink shared channel (the coding includes repetitions). Examples of the applicable coding scheme include convolutional coding, turbo coding, Low Density Parity Check (LDPC) coding, and Polar coding. The modulation unit 1042 modulates the coded bits input from the coding unit 1040, in compliance with a modulation scheme such as BPSK, QPSK, 16QAM, 64QAM, or 256QAM that is predetermined/determined by the higher layer processing unit 102.

The downlink control channel generation unit 1046 adds the CRC to the downlink control information input from the controller 108. Furthermore, the downlink control channel generation unit 1046 codes and modulates the downlink control information, and generates a physical downlink control channel. The downlink reference signal generation unit 1048 generates a downlink reference signal.

The mapping unit 1044 maps the modulation symbols of each modulated downlink physical channel, the physical downlink control channel, and the downlink reference signal to the resource elements. The mapping unit 1044 maps the physical downlink shared channel and the physical downlink control channel to physical resources allocated to each terminal apparatus. Based on the configuration for the downlink subcarrier spacing, the mapping unit 1044 maps the physical downlink shared channel, the physical downlink control channel, and the like to the physical resources.

The radio transmitting unit 1050 generates OFDM symbols by performing Inverse Fast Fourier Transform (IFFT) on the modulation symbols of each multiplexed downlink physical channel. The radio transmitting unit 1050 performs inverse high-speed Fourier transformations based on the subcarrier spacing used to transmit each downlink physical channel. The radio transmitting unit 1050 adds cyclic prefixes (CPs) to the OFDM symbols to generate a baseband digital signal. Furthermore, the radio transmitting unit 1050 converts the digital signal into an analog signal, removes unnecessary frequency components by filtering, up-converts the resultant signal into the carrier frequency, amplifies power, and outputs the resultant signal to the transmit antenna 106 to transmit an OFDM signal.

The radio receiving unit 1120 converts, by down-converting, an uplink signal received through the receive antenna 110 into a baseband signal, removes unnecessary frequency components, controls the amplification level in such a manner as to suitably maintain the signal level, performs orthogonal detection based on an in-phase component and an orthogonal component of the received signal, and converts the resulting orthogonally-detected analog signal into a digital signal. The radio receiving unit 1120 removes portions corresponding to the CPs from the digital signal resulting from the conversion. The radio receiving unit 1120 performs Fast Fourier Transform (FFT) on the signal from which the CPs have been removed, and extracts a frequency domain signal. The radio receiving unit 1120 performs the fast Fourier transform based on the subcarrier spacing at which each uplink signal is mapped. The subcarrier spacing at which each uplink signal is mapped is notified from the controller 108.

The channel estimation unit 1122 uses the demodulation reference signal to perform channel estimation for signal detection of the uplink physical channel. The channel estimation unit 1122 uses the demodulation reference signal sequence to measure a channel state between the base station apparatus 10 and the terminal apparatus 20.

The demapping unit 1124 extracts, for each terminal apparatus, the uplink physical channel (physical uplink shared channel, physical uplink control channel, or the like) and the uplink physical signal (synchronization signal or the like) from the frequency domain signal input from the radio receiving unit 1120. The demapping unit 1124 extracts the uplink physical channels for each terminal apparatus based on the uplink scheduling information input from the controller 108. The demapping unit 1124 extracts the uplink physical channel including the ACK/NACK, based on the configuration for the uplink time slot for the ACK/NACK transmission (latency time k) and the time slot unit for the ACK/NACK interpreted from the subcarrier spacing. The demapping unit 1124 may extract the uplink physical channel including the ACK/NACK, based on the configuration for the uplink time slot for the ACK/NACK transmission (latency time k) and the time slot unit for the ACK/NACK interpreted from the OFDM symbol length. Hereinafter, the equalization unit 1126, the IDFT unit 1128, the despreading unit 1130, the demodulation unit 1132, and the decoding unit 1134 perform processing for each uplink data for each terminal apparatus.

The equalization unit 1126 performs channel compensation on signals for each terminal apparatus input from the demapping unit 1124 using results of channel estimation input from the channel estimation unit 1122. For example, the equalization unit 1126 multiplies the frequency domain signal by an equalization weight based on the MMSE rule.

The IDFT unit 1128 converts the equalized frequency domain signal for each terminal apparatus into a time domain signal. Note that the IDFT unit 1128 corresponds to processing performed by the DFT unit 2104 of the terminal apparatus 20.

The despreading unit 1130 multiplies, by the spreading code sequence, the time domain signal for each terminal apparatus resulting from the IDFT (despreading processing). In the terminal apparatus 20, in a case that the spreading processing has been performed on the signal resulting from the DFT, despreading processing is performed on the signal not subjected to the IDFT yet. Note that, in the terminal apparatus 20, in a case that interleaving has been performed, de-interleaving processing is performed.

The demodulation unit 1132 receives, from the controller 108, information about the modulation scheme for each terminal apparatus that is notified in advance or predetermined. The demodulation unit 1132 performs demodulation processing on the despread signal, based on the information about the modulation scheme, and outputs a Log Likelihood Ratio (LLR) of a bit sequence.

The decoding unit 1134 receives, from the controller 108, information about the coding rate that is notified in advance or predetermined. The decoding unit 1134 performs decoding processing on the LLR sequence output from the demodulation unit 1132.

The higher layer processing unit 102 acquires the decoded uplink data for each terminal apparatus (bit sequence resulting from hard decision) from the decoding unit 1134. The higher layer processing unit 102 performs descrambling (exclusive logical sum operation) on the CRC included in the decoded uplink data for each terminal apparatus, by using the UE ID allocated to each terminal. In a case that error detection based on the descrambling results in no error in the uplink data, the higher layer processing unit 102 determines that the identification of the terminal apparatus has been correctly completed and that the uplink data transmitted from the terminal apparatus can have been correctly received.

As described above, in the communication system according to the present embodiment, the base station apparatus and the terminal apparatus communicate using different symbol lengths for the uplink and for the downlink. As a result, the ACK/NACK for the information data is transmitted using a subcarrier spacing different from the subcarrier spacing for the information data (that is, an OFDM symbol length different from the OFDM symbol length for the information data). The ACK/NACK transmission timing (latency time k) is counted in a unit of time slots selected based on the subcarrier spacing or the OFDM symbol length. This may adjust the ACK/NACK time slot length difference between the information data and the information data. Furthermore, by providing multiple time slot references, a difference in time slot length between the information data and the ACK/NACK for the information data can be flexibly adjusted depending on applications of the base station apparatus and the terminal apparatus and the like.

Second Embodiment

Figure 11:
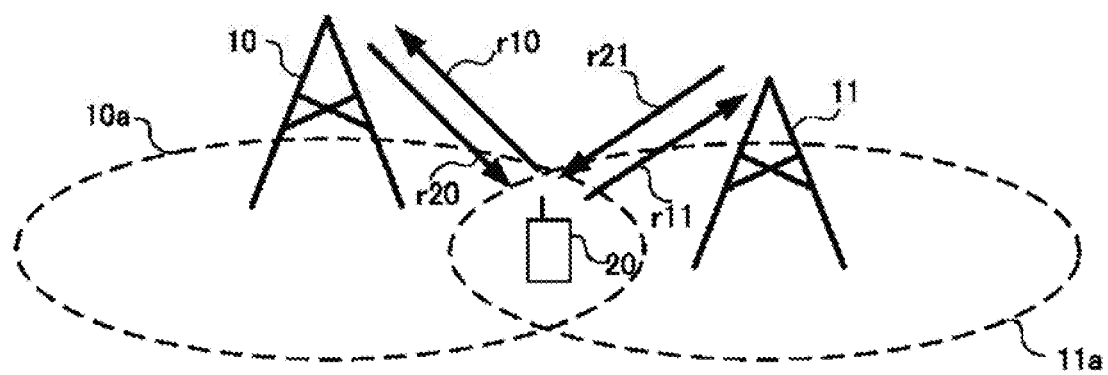
FIG. 11 is a diagram illustrating an example of a configuration of a communication system according to a second embodiment.

The present embodiment is an example in which, in carrier aggregation, different subcarrier spacings are configured for respective cells (component carriers)/for the uplink and for the downlink. FIG. 11 is a diagram illustrating an example of a configuration of a communication system according to the present embodiment. The communication system in the present embodiment includes base station apparatuses 10 and 11 and a terminal apparatus 20. Each of coverages 10a and 11a is a range (a communication area) in which the base station apparatuses 10 and 11 can connect to the terminal apparatus 20 (the coverage is also referred to as a cell or a component carrier). The area of the coverage 10a constitutes a Primary Cell (Pcell, first component carrier). The area of the coverage 11a constitutes a Secondary Cell (Scell, second component carrier). The terminal apparatus 20 can transmit the uplink signal through carrier aggregation by using an uplink r10 of the Pcell and an uplink r11 of the Scell. The terminal apparatus 20 can transmit the downlink signal through carrier aggregation using a downlink r20 of the Pcell and a downlink r21 of the Scell. Note that, in FIG. 11, different base station apparatuses constitute the Pcell and the Scell but that one base station apparatus may constitute the Pcell and the Scell. The base station apparatus 10 and base station apparatus 11 in FIG. 11 include a configuration illustrated in FIG. 10. The terminal apparatus 20 includes a configuration illustrated in FIG. 9. Differences from/additions to the first embodiment will be mainly described below. Note that the coverages 10a and 11a can accommodate multiple terminal apparatuses 20 and that the number of accommodating terminals is not limited to the number illustrated in FIG. 11. The number of component carriers (number of Scells) for carrier aggregation is not limited to the number illustrated in FIG. 11.

In the communication system according to the present embodiment, different subcarrier spacings can be configured for the respective component carriers (Pcell and Scell). The base station apparatus 10 constituting the Pcell comprehensively configures a subcarrier spacing set for the component carriers for each terminal apparatus (subcarrier spacing set common to the component carriers). In this case, for the Scell, the same uplink and downlink subcarrier spacing sets as those configured for the Pcell are configured. The terminal apparatus 20 and the base station apparatus 11 constituting the Scell use, for the Scell, the subcarrier spacing set configured for the Pcell. Furthermore, the base station apparatus 10 can comprehensively configure an uplink subcarrier spacing set for (uplink subcarrier spacing set that is common to) the Pcell and the Scell and a downlink subcarrier spacing set for (downlink subcarrier spacing set that is common to) the Pcell and the Scell. In this case, the same subcarrier spacing set is configured for the uplink and for the downlink regardless of the component carrier.

The base station apparatus 10 notifies the terminal apparatus 20 of configuration information related to the Scell using the downlink physical channel such as the RRC message. The configuration information related to the Scell can include a cell ID/frequency band/subcarrier spacing set of an additional Scell. In a case that the subcarrier spacing set is included in the configuration information related to the Scell, the subcarrier spacing set may be updated for both Pcell and Scell. Note that the subcarrier spacing set is considered to indicate configuration and update of available candidates for the OFDM symbol length (or the SC-FDMA symbol length).

The base station apparatus 10 constituting the Pcell may configure the subcarrier spacing set for each component carrier (Pcell, Scell) for each terminal apparatus. In this case, different subcarrier spacing sets may be configured for the respective component carriers (for Pcell or Scell). The subcarrier spacing set for each Scell is notified to the terminal apparatus by using configuration information related to the Scell. Furthermore, the subcarrier spacing set for each Scell may be configured independently for the uplink and for the downlink. Note that the subcarrier spacing set for the Scell may be notified to the terminal apparatus using the downlink physical channel in each component carrier.

The terminal apparatus 20 receives the downlink control information in the Pcell/Scell. The downlink control information includes information related to one subcarrier spacing selected from the subcarrier spacing set. The terminal apparatus 20 determines a subcarrier spacing for the reception of the downlink physical channel and the mapping of the uplink physical channel, based on the information included in the downlink control information and related to the subcarrier spacing. The base station apparatus 10 constituting the Pcell can notify the terminal apparatus 20 of the information used in the uplink and downlink of the Scell and related to the subcarrier spacing. The base station apparatus 11 constituting the Scell can notify the terminal apparatus 20 of the information used in the uplink and downlink of the Pcell and related to the subcarrier spacing. The information included in the downlink control information and related to the subcarrier spacing is considered to indicate the OFDM symbol length (SC-FDMA symbol length) for the reception of the downlink physical channel and the mapping of the uplink physical channel.

The terminal apparatus 20 transmits, on the physical uplink control channel, the ACK/NACK for the physical downlink shared channel transmitted in the Pcell and the Scell. The base station apparatus 10 uses the RRC message/downlink control information to notify the terminal apparatus 20 whether to transmit the ACK/NACK on one or both of the Pcell and Scell physical uplink control channels. The base station apparatus 10 can indicate that the physical uplink control channel in the Pcell or Scell is used to collectively notify the ACK/NACKs for the physical downlink shared channels transmitted in the Pcell and Scell.

FIGS. 12A to 12C are diagrams illustrating examples of the ACK/NACK transmission timing in the carrier aggregation according to the present embodiment. FIGS. 12A to 12C are examples in which the base station apparatus 10 configures Pcell downlink and uplink subcarrier spacings to be 15 kHz and configures Scell downlink and uplink subcarrier spacings to be 60 kHz. FIG. 12A illustrates a downlink time slot in the Pcell. FIG. 12B illustrates a downlink time slot in the Scell. FIG. 12C illustrates an uplink time slot in the Pcell. Note that an uplink time slot in the Scell is the same as the time slot in FIG. 12C.

The terminal apparatus 20 receives the downlink physical downlink shared channel in the Pcell downlink and in the Scell downlink through carrier aggregation. The downlink time slot length corresponds to the time domain of the downlink resource allocation unit. The downlink physical downlink shared channel (e.g., a downlink transport block) is allocated for each downlink time slot. FIGS. 12A to 12C are examples in which one downlink transport block is transmitted in the Pcell downlink and in which two downlink transport blocks are transmitted in the Scell downlink (shaded portions). The terminal apparatus 20 collectively transmits, on the Pcell physical uplink control channel, the ACK/NACKs for the downlink physical downlink shared channels received in the Pcell and the Scell (upward-sloping diagonal portion). $n_{\_DL1}$ is a downlink time slot in which the Pcell downlink physical downlink shared channel is transmitted. $n_{\_UL1}$ is an uplink time slot in which the ACK/NACK is transmitted in the Pcell.

In FIGS. 12A to 12C, the base station apparatus 10 configures the latency time k when the ACK/NACK is received, with reference to (using, as units) the time slots with the subcarrier spacing used for the component carrier in which the ACK/NACK is transmitted. The terminal apparatus 20 counts the latency time k when the ACK/NACK is transmitted, with reference to the time slot at the subcarrier spacing used for the component carrier in which the ACK/NACK is transmitted. FIGS. 12A to 12C examples of k=3. In FIGS. 12A to 12C, the ACK/NACK is transmitted in the Pcell, and thus, the base station apparatus 10 and the terminal apparatus 20 interpret the latency time k with reference to the Pcell uplink time slot (i.e., the OFDM symbol length at a subcarrier spacing of 15 kHz). An end point of $n_{\_UL1}-k$ corresponds to a timing at which the terminal apparatus 20 completes, in $n_{\_UL1}$, the reception of the physical downlink shared channel transmitting the ACK/NACK. Note that the present embodiment can also be applied to time division multiplexing in which the same frequency is used in the downlink and in the uplink. For example, in a case that each of the Pcell downlink and uplink subcarrier spacings is 15 kHz and each of the Scell downlink and uplink subcarrier spacings is 60 kHz, the terminal apparatus counts the latency time k in which the ACK/NACK is transmitted, with reference to the time slot at the Pcell subcarrier spacing.

FIGS. 13A to 13C are diagrams illustrating another example of the ACK/NACK transmission timing in the carrier aggregation according to the present embodiment. FIGS. 13A to 13C are examples in which the base station apparatus 10 configures the Pcell downlink and Scell uplink subcarrier spacings to be 15 kHz and configures the Scell downlink and Pcell uplink subcarrier spacings to be 60 kHz. FIG. 13A illustrates a downlink time slot in the Pcell. FIG. 13B illustrates a downlink time slot in the Scell. FIG. 13C illustrates an uplink time slot in the Pcell. Note that the uplink time slot in the Scell is the same as the time slot in FIG. 13A.

The terminal apparatus 20 receives the downlink physical downlink shared channel in the Pcell downlink and in the Scell downlink through carrier aggregation. FIGS. 13A to 13C are examples in which one downlink transport block is transmitted in the Pcell downlink and in which four downlink transport blocks are transmitted in the Scell downlink (shaded portions). The terminal apparatus 20 collectively transmits, on the Pcell physical uplink control channel, the ACK/NACKs for the downlink physical downlink shared channels received in the Pcell and the Scell (upward-sloping diagonal portion). $n_{\_DL1}$ is a downlink time slot in which the Pcell downlink physical downlink shared channel is transmitted. $n_{\_UL1}$ is an uplink time slot in which the ACK/NACK is transmitted in the Pcell.

In FIGS. 13A to 13C, the base station apparatus 10 configures the latency time k when the ACK/NACK is received, with reference to (using, as units) the time slots with the subcarrier spacing used for the component carrier in which the ACK/NACK is transmitted. The terminal apparatus 20 counts the latency time k when the ACK/NACK is transmitted, with reference to the time slot at the subcarrier spacing used for the component carrier in which the ACK/NACK is transmitted. FIGS. 13A to 13C are examples of k=3. In FIGS. 13A to 13C, the ACK/NACK is transmitted in the Pcell, and thus, the base station apparatus 10 and the terminal apparatus 20 interpret the latency time k with reference to the Pcell uplink time slot (i.e., the OFDM symbol length at a subcarrier spacing of 60 kHz). The end point of the $n_{\_UL1}$-k corresponds to the timing at which the terminal apparatus 20 completes, in the $n_{\_UL1}$, the reception of the physical downlink shared channel transmitting the ACK/NACK.

FIGS. 14A to 14D are diagrams illustrating another example of the ACK/NACK transmission timings in the carrier aggregation according to the present embodiment. FIGS. 14A to 14D are examples in which the base station apparatus 10 configures the Pcell downlink and Pcell uplink subcarrier spacings to be 15 kHz and configures the Scell downlink and Scell uplink subcarrier spacings to be 60 kHz. FIG. 14A illustrates a downlink time slot in the Pcell. FIG. 14B illustrates a downlink time slot in the Scell. FIG. 14C illustrates an uplink time slot in the Pcell. FIG. 14D illustrates an uplink time slot in the Scell.

The terminal apparatus 20 receives the downlink physical downlink shared channel in the Pcell downlink and in the Scell downlink through carrier aggregation. FIGS. 14A to 14D are examples in which one downlink transport block is transmitted in the Pcell downlink and in which four downlink transport blocks are transmitted in the Scell downlink (shaded portions). The terminal apparatus 20 collectively transmits, on the physical uplink control channel in the Scell, the ACK/NACKs for the downlink physical downlink shared channels received in the Pcell and Scell (upward-sloping diagonal portion). $n_{\_DL1}$ is a downlink time slot in which the Pcell downlink physical downlink shared channel is transmitted. $n_{\_UL2}$ is an uplink time slot in which the ACK/NACK is transmitted in the Scell. $n_{\_UL1}$ is an uplink time slot in a case that the base station apparatus 10 selects to transmit the ACK/NACK in the Pcell.

In FIGS. 14A to 14D, the base station apparatus 10 configures the latency time k when the ACK/NACK is received, with reference to (using, as units) the time slots with the subcarrier spacing used for the Pcell. The terminal apparatus 20 counts the latency time k when the ACK/NACK is transmitted, with reference to the time slot at the subcarrier spacing used for the Pcell. In other words, regardless of the component carrier to which a collective ACK/NACK is mapped, the latency time k is configured with reference to (using, as a unit) the time slot at the subcarrier spacing used for the Pcell. FIGS. 14A to 14D are examples of k=3. In FIGS. 14A to 14D, the Pcell uplink time slot has the time slot length determined by the subcarrier spacing of 15 kHz. Thus, the base station apparatus 11 and the terminal apparatus 20 interpret the latency time k with reference to the time slot length determined by the subcarrier spacing of 15 kHz. The terminal apparatus 20 transmits the ACK/NACK in the interval of the uplink time slot $n_{\_UL1}$. FIG. 14D indicates a case where the time slot $n_{\_UL2}$ in which the ACK/NACK is transmitted is configured to be a leading Scell uplink time slot in the $n_{\_UL1}$ interval. Note that the end point of the $n_{\_UL1}$-k corresponds to a timing when the terminal apparatus 20 completes the reception of the physical downlink shared channel. FIGS. 14A to 14D are examples in which the ACK/NACK is transmitted in the leading Scell uplink time slot in the $n_{\_UL1}$ interval. However, the trailing or any other uplink time slot in the $n_{\_UL1}$ interval may be used for the transmission. For example, which Scell uplink time slot in the $n_{\_UL1}$ interval is used to transmit the ACK/NACK may be associated with the UE ID, the transmit antenna port number, the downlink resource allocation position, or the like. Thus, the uplink time slot in which the ACK/NACK is transmitted can be randomized.

FIGS. 15A to 15C are diagrams illustrating another example of the ACK/NACK transmission timing in the carrier aggregation according to the present embodiment. FIGS. 15A to 15C are examples in which the base station apparatus 10 configures the Pcell downlink and Pcell uplink subcarrier spacings to be 15 kHz and configures the Scell downlink and Scell uplink subcarrier spacings to be 60 kHz. FIG. 15A illustrates a downlink time slot in the Pcell. FIG. 15B illustrates a downlink time slot in the Scell. FIG. 15C illustrates an uplink time slot in the Pcell. Note that the uplink time slot in the Scell is the same as the time slot in FIG. 15B.

The terminal apparatus 20 receives the physical downlink downlink shared channel in the Pcell downlink and the Scell downlink through the carrier aggregation. FIGS. 15A and 15C are examples in which one downlink transport block is transmitted in the Pcell downlink and in which four downlink transport blocks are transmitted in the Scell downlink (shaded portions). The terminal apparatus 20 collectively transmits, on the Pcell physical uplink control channel, the ACK/NACKs for the downlink physical downlink shared channels received in the Pcell and the Scell (upward-sloping diagonal portion). $n_{\_DL1}$ is a downlink time slot in which the Pcell downlink physical downlink shared channel is transmitted. $n_{\_UL1}$ is an uplink time slot in which the ACK/NACK is transmitted in the Pcell.

In FIGS. 15A to 15C, the base station apparatus 10 configures the latency time k when the ACK/NACK is received, with reference to (using, as units) the time slots for one of the component carriers in which the physical downlink shared channel has been transmitted, the one component carrier having a smaller subcarrier spacing (or a larger OFDM symbol length). The terminal apparatus 20 counts the latency time k when the ACK/NACK is transmitted, with reference to (using, as units) the time slots for one of the component carriers in which the physical downlink shared channel has been transmitted, the one component carrier having a smaller subcarrier spacing (or a larger OFDM symbol length). FIGS. 15A to 15C are examples of k=3. In FIGS. 15A to 15C, the Pcell downlink subcarrier spacing is smaller than the Scell downlink subcarrier spacing (the Scell downlink OFDM symbol length is larger than the Pcell downlink OFDM symbol length). Thus, the base station apparatus 11 and the terminal apparatus 20 interpret the latency time k with reference to the time slot length determined by the Pcell downlink subcarrier spacing of 15 kHz. Note that the end point of the $n_{\_UL1}$-k corresponds to the timing when the terminal apparatus 20 completes the reception of the physical downlink shared channel.

FIGS. 16A to 16C are diagrams illustrating another example of the ACK/NACK transmission timing in the carrier aggregation according to the present embodiment. FIGS. 16A to 16C are examples in which the base station apparatus 10 configures the Pcell downlink and Pcell uplink subcarrier spacings to be 15 kHz and configures the Scell downlink and Scell uplink subcarrier spacings to be 60 kHz. FIG. 16A illustrates a downlink time slot in the Pcell. FIG. 16B illustrates a downlink time slot in the Scell. FIG. 16C illustrates an uplink time slot in the Pcell. Note that the uplink time slot in the Scell is the same as the time slot in FIG. 16B.

The terminal apparatus 20 receives the physical downlink downlink shared channel in the Pcell downlink and the Scell downlink through the carrier aggregation. FIGS. 16A to 16C are examples in which one downlink transport block is transmitted in the Pcell downlink and in which four downlink transport blocks are transmitted in the Scell downlink (shaded portions). The terminal apparatus 20 collectively transmits, on the Pcell physical uplink control channel, the ACK/NACKs for the downlink physical downlink shared channels received in the Pcell and the Scell (upward-sloping diagonal portion). $n_{\_DL1}$ is a downlink time slot in which the Pcell downlink physical downlink shared channel is transmitted. $n_{\_DL2}$ is a downlink time slot corresponding to the last of the downlink physical downlink shared channels transmitted in the Scell through the carrier aggregation (an end point of the $n_{\_DL2}$ coincides with an end point of the $n_{\_DL1}$). $n_{\_UL1}$ is an uplink time slot in which the ACK/NACK is transmitted in the Pcell.

In FIGS. 16A to 16C, the base station apparatus 10 configures the latency time k when the ACK/NACK is received, with reference to (using, as units) the time slots for one of the component carriers in which the physical downlink shared channel has been transmitted, the one component carrier having a larger subcarrier spacing (or a smaller OFDM symbol length). The terminal apparatus 20 counts the latency time k when the ACK/NACK is transmitted, with reference to (using, as units) the time slots for one of the component carriers in which the physical downlink shared channel has been transmitted, the one component carrier having a larger subcarrier spacing (or a smaller OFDM symbol length). FIGS. 16A to 16C are examples of k=3. In FIGS. 16A to 16C, the Scell downlink subcarrier spacing is larger than the Pcell downlink subcarrier spacing (the Scell downlink OFDM symbol length is smaller than the Pcell downlink OFDM symbol length). Thus, the base station apparatus 11 and the terminal apparatus 20 interpret the latency time k with reference to the time slot length determined by the Scell downlink subcarrier spacing of 60 kHz (time slot length of the $n_{\_DL2}$).

The base station apparatus 10 can change an ACK/NACK notification means depending on the subcarrier spacings (or OFDM symbol lengths) of the Pcell and Scell in which the physical downlink shared channel has been transmitted. In a case that the subcarrier spacings (or OFDM symbol lengths) of the Pcell and Scell in which the physical downlink shared channel has been transmitted are the same, the base station apparatus 10 collectively notifies the ACK/NACKs (group ACK/NACK) using the physical uplink control channel in the Pcell or Scell. In a case that the subcarrier spacings (or OFDM symbol lengths) of the Pcell and Scell in which the physical downlink shared channel has been transmitted are different, the base station apparatus 10 transmits the ACK/NACK for the physical downlink shared channel transmitted in the Pcell independently of the ACK/NACK for the physical downlink shared channel transmitted in the Scell. (In a case that the subcarrier spacings of Pcell and Scell in which the physical downlink shared channel has been transmitted are different, collective notification of the ACK/NACKs is inhibited). The terminal apparatus 20 can change the format of the uplink control information by using the collective ACK/NACK or the independent ACK/NACK. The format of uplink control information used for the collective ACK/NACK involves a larger number of bits (or a larger number of fields) than the format of the independent ACK/NACK.

FIGS. 17A to 17C are diagrams illustrating another example of the ACK/NACK transmission timing in the carrier aggregation according to the present embodiment. FIGS. 17A to 17C are examples in which the base station apparatus 10 configures the Pcell and Scell downlink subcarrier spacings to be the same value of 15 kHz. The Pcell and Scell uplink subcarrier spacings are configured to be 60 kHz. FIG. 17A illustrates a downlink time slot in the Pcell. FIG. 17B illustrates a downlink time slot in the Scell. FIG. 17C illustrates an uplink time slot in the Pcell. Note that the uplink time slot in the Scell is the same as the time slot in FIG. 16C.

In FIGS. 17A to 17C, the carrier aggregation is configured using the same subcarrier spacing for the Pcell and for the Scell (shaded portions). For this reason, the base station apparatus 10 can select either the collective ACK/NACK transmission or the independent ACK/NACK transmission. In FIG. 17C, the ACK/NACKs for the downlink physical downlink shared channels received in the Pcell and Scell are collectively transmitted on the Pcell physical uplink control channel (upward-sloping diagonal portion). The base station apparatus 10 can notify the terminal apparatus of which ACK/NACK transmission is to be used by the RRC message/downlink control information. $n_{\_DL1}$ is a downlink time slot in which the Pcell downlink physical downlink shared channel is transmitted. $n_{\_DL2}$ is a downlink time slot in which the Scell downlink physical downlink shared channel is transmitted. $n_{\_UL1}$ is an uplink time slot in which the ACK/NACK is transmitted in the Pcell.

In FIGS. 17A to 17C, it is assumed that the base station apparatus 10 has configured the latency time k when the ACK/NACK is received, with reference to (using, as units) the time slots for one of the component carriers in which the physical downlink shared channel has been transmitted, the one component carrier having a smaller subcarrier spacing. In this case, since the subcarrier spacings of Pcell and Scell are the same, the base station apparatus and the terminal apparatus interpret the latency time k based on the downlink time slots in common with both component carriers. The terminal apparatus 20 transmits the collective ACK/NACK in an interval of the Pcell downlink time slot $n_{\_DL1}$+k. FIGS. 17A to 17C are examples of k=3.

FIGS. 18A to 18D are diagrams illustrating another example of the ACK/NACK transmission timing in the carrier aggregation according to the present embodiment. FIGS. 18A to 18D are examples, for the base station apparatus 10, in which the Pcell and Scell downlink subcarrier spacings are different. FIG. 18A illustrates a downlink time slot in the Pcell. FIG. 18B illustrates a downlink time slot in the Scell. FIG. 18C illustrates an uplink time slot in the Pcell. FIG. 18D illustrates an uplink time slot in the Pcell.

In FIGS. 18A to 18D, the carrier aggregation is configured using different subcarrier spacings for the Pcell and for the Scell (shaded portions). In this case, the collective ACK/NACK is inhibited. The ACK/NACK for the physical downlink shared channel transmitted in the Pcell is transmitted on the Pcell physical uplink control channel. The ACK/NACK for the physical downlink shared channel transmitted in the Scell is transmitted on the Scell physical uplink control channel. In a case that the ACK/NACK for the physical downlink shared channel transmitted in each component carrier is independently transmitted, the base station apparatus 10 can configure the latency time k (in FIGS. 18A to 18D, k=3) when the ACK/NACK is received, with reference to (using, as units) the time slots with the subcarrier spacing configured for each component carrier. FIGS. 18A to 18D are examples in which the time slot $n_{UL1}$ for the ACK-NACK transmitted in the Pcell is configured with reference to the Pcell uplink time slot. The time slot $n_{UL2}$ for the ACK/NACK transmitted in the Scell is configured with reference to the Scell uplink time slot. Note that, in a case that the ACK/NACK for the physical downlink shared channel transmitted in each component carrier is transmitted independently, the base station apparatus 10 can configure the latency time k when the ACK/NACK is received, by using the time slot references described in FIGS. 12A to 12C to FIGS. 16A to 16C.

In FIGS. 12A to 12C to FIGS. 18A to 18D, the terminal apparatus 20 interprets the time slot reference used for counting the latency time k when the ACK/NACK is transmitted, based on the results of identification of the Pcell and the Scell and further identification of the uplink and downlink subcarrier spacings (or OFDM symbol lengths). The base station apparatus 10 uses the subcarrier spacing notified using the RRC message/system information/downlink control information, to implicitly indicate the time slot reference used for counting the latency time k when the ACK/NACK is transmitted.

The base station apparatus 10 can notify the Pcell and the Scell and further the OFDM symbol length (SC-FDMA symbol length) used for the uplink and downlink transmission, using the RRC message/system information/downlink control information. The terminal apparatus 20 may identify, from the OFDM symbol length, units of uplink time slots and downlink time slots in the Pcell and Scell. The base station apparatus 10 can also implicitly indicate the time slot reference used for counting the latency time k when the ACK/NACK is transmitted, using the OFDM symbol length notified using the RRC message/system information/downlink control information. Note that the base station apparatus 10 can also explicitly notify the time slot reference used for counting the latency times k when the ACK/NACK is transmitted, using the RRC message/system information/ downlink control information.

As described above, in the communication system according to the present embodiment, the base station apparatus and the terminal apparatus communicate using different symbol lengths for the respective component carriers in which the carrier aggregation is performed and for the uplink and for the downlink. Thus, the ACK/NACK for the information data is transmitted using a subcarrier spacing different from the subcarrier spacing for the information data. The ACK/NACK transmission timing (latency time k) is counted in a unit of time slots selected based on the subcarrier spacing or OFDM symbol length for each component carrier. This may adjust a difference in counter between the information data and the ACK/NACK for the information data. Furthermore, by providing multiple time slot references, a difference in time slot length between the information data and the ACK/NACK for the information data can be flexibly adjusted, based on the applications of the base station apparatus and the terminal apparatus and the like.

Note that, in carrier aggregation using multiple Scells, the configuration for the time slot unit for the ACK/NACK transmission according to the present embodiment can be applied. In addition, the configuration for the time slot unit for the ACK/NACK transmission according to the present embodiment may also be applied to Dual Connectivity (hereinafter referred to as DC). The Pcell and the Scell according to the present embodiment can respectively be replaced with a Master Cell Group (MCG) and a Secondary Cell Group (SCG) in DC, and the configuration for the time slot unit for the ACK/NACK transmission according to the present embodiment can be applied to the MCG and the SCG. The Pcell and the Scell according to the present embodiment can respectively be replaced with a Primary Scell (PScell) and the Scell in DC, and the configuration for the time slot unit for the ACK/NACK transmission according to the present embodiment can be applied to the PScell and the Scell.

Third Embodiment

The present embodiment is an example in which one terminal apparatus receives a downlink signal at the same time using resource allocation units with multiple subcarrier spacings. For example, in FIG. 3, the base station apparatus 10 transmits the downlink signal to the terminal apparatus 20 using a resource allocation unit A and a resource allocation unit B (using the resource allocation units overlapping with each other in the time domain). The terminal apparatus 20 collectively transmits the ACK/NACK to physical downlink shared channels (downlink transport blocks) mapped to the resource allocation unit A and the resource allocation unit B. The base station apparatus 10 according to the present embodiment includes the configuration illustrated in FIG. 10. The terminal apparatus 20 includes the configuration illustrated in FIG. 9. Differences from/additions to the first embodiment will be mainly described below.

In the communication system according to the present embodiment, the transmission timing for the ACK/NACK in FIGS. 12A to 12C to FIGS. 18A to 18D can also be used. For example, in the downlink, the base station apparatus 10 uses the configuration of the physical resources in FIG. 3 to transmit the downlink physical channel to the terminal apparatus 20. In this case, the region with the subcarrier spacing of 15 kHz in FIG. 3 may be replaced with the Pcell downlink in FIGS. 12A to 12C to FIGS. 18A to 18D. In addition, the region with the subcarrier spacing of 30 kHz in FIG. 3 may be replaced with the Scell downlink in FIGS. 12A to 12C to FIGS. 18A to 18D. The resource allocation unit A in FIG. 3 may be replaced with the Pcell downlink time slot in FIGS. 12A to 12C to FIGS. 18A to 18D. The resource allocation unit B in FIG. 3 may be replaced with the Scell downlink time slot in FIGS. 12A to 12C to FIGS. 18A to 18D.

Furthermore, in the uplink, the terminal apparatus 20 uses the configuration of the physical resources in FIG. 3 to transmit the physical downlink control channel to the base station apparatus 10. The physical downlink control channel includes the ACK/NACK. In this case, the region with the subcarrier spacing of 15 kHz in FIG. 3 may be replaced with the Pcell uplink in FIGS. 12A to 12C to FIGS. 18A to 18D. In addition, the region with the subcarrier spacing of 30 kHz in FIG. 3 may be replaced with the Scell uplink in FIGS. 12A to 12C to FIGS. 18A to 18D. The resource allocation unit A in FIG. 3 may be replaced with the Pcell uplink time slot in FIGS. 12A to 12C to FIGS. 18A to 18D. The resource allocation unit B in FIG. 3 may be replaced with the Scell uplink time slot in FIGS. 12A to 12C to FIGS. 18A to 18D.

A case in which the transmission timing for the ACK/NACK in FIGS. 12A to 12C is applied to the present embodiment will be specifically described. It is assumed that the base station apparatus 10 transmits the physical downlink shared channel by using the resource allocation unit A and the resource allocation unit B in FIG. 3. In this case, the physical downlink shared channel allocated to the resource allocation unit A corresponds to the shaded portion in FIG. 12A indicating the Pcell downlink. In addition, the physical downlink shared channel allocated to the resource allocation unit B corresponds to the shaded portion in FIG. 12B indicating the Scell downlink.

It is assumed that the terminal apparatus 20 transmits the ACK/NACK by using the resource allocation unit A in FIG. 3. In this case, the ACK/NACK allocated to the resource allocation unit A corresponds to the upward-sloping diagonal portion in FIG. 12C indicating the Pcell uplink. Note that the transmission timings for the ACK/NACK in FIGS. 13 to 18 can be similarly applied to the base station apparatus 10 and the terminal apparatus 20 according to the present embodiment.

As described above, in the communication system according to the present embodiment, the base station apparatus and the terminal apparatus communicate using resource allocation units with multiple subcarrier spacings at the same time. In this way, the base station apparatus transmits information data to one terminal apparatus using different subcarrier spacings at the same time. The ACK/NACK for the information data may be transmitted using subcarrier spacing different from the information data. The ACK/NACK transmission timing (latency time k) is counted in units of time slots selected based on the subcarrier spacing or OFDM symbol length in each resource allocation unit. This may adjust a difference in counter between the information data and the ACK/NACK for the information data. Furthermore, by providing multiple time slot references, a difference in time slot length between the information data and the ACK/NACK for the information data can be flexibly adjusted, based on the applications of the base station apparatus and the terminal apparatus and the like.

A program running on an apparatus according to one aspect of the present invention may serve as a program that controls a Central Processing Unit (CPU) and the like to cause a computer to operate in such a manner as to realize the functions of the above-described embodiment according to one aspect of the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Moreover, the apparatuses in the above-described embodiment may be partially enabled by a computer. In that case, a program for realizing the functions of the embodiments may be recorded in a computer readable recording medium. The functions may be realized by causing a computer system to read the program recorded in the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used to transmit the program over a network such as the Internet or over a communication line such as a telephone line, and may also include a medium that retains a program for a fixed period of time, such as a volatile memory within the computer system for functioning as a server or a client in such a case. Furthermore, the program may be configured to realize some of the functions described above, and also may be configured to be capable of realizing the functions described above in combination with a program already recorded in the computer system.

Furthermore, each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may be constituted of a digital circuit or an analog circuit. Furthermore, in a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiments, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be preferably used in a base station apparatus, a terminal apparatus, and a communication method. An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 10, 11 Base station apparatus
20 Terminal apparatus
10a Area in which the base station apparatus 10 can connect to the terminal apparatus 20
11a Area in which the base station apparatus 11 can connect to the terminal apparatus 20
102 Higher layer processing unit
104 Transmitter
106 Transmit antenna
108 Controller
110 Receive antenna
112 Receiver
1040 Coding unit
1042 Modulation unit
1044 Mapping unit
1046 Downlink control channel generation unit
1048 Downlink reference signal generation unit
1050 Radio transmitting unit
1120 Radio receiving unit
1122 Channel estimation unit
1124 Demapping unit
1126 Equalization unit
1128 IDFT unit
1130 Despreading unit
1132 Demodulation unit
1134 Decoding unit
202 Receive antenna
204 Receiver
206 Higher layer processing unit
208 Controller
210 Transmitter
212 Transmit antenna
2100 Coding unit
2102 Modulation unit
2104 DFT unit
2106 Spreading unit
2108 Mapping unit
2110 Radio transmitting unit
2112 Uplink reference signal generation unit
2040 Radio receiving unit
2042 Demapping unit
2044 Demodulation unit
2046 Decoding unit

The invention claimed is:

1. A terminal apparatus communicating with a base station apparatus, the terminal apparatus comprising:
receiving circuitry configured to receive downlink control information (DCI) in a physical downlink control channel (PDCCH) and receive a radio resource control (RRC) signaling in a physical downlink shared channel (PDSCH); and
transmitting circuitry configured to transmit a hybrid automatic repeat request-acknowledgment (HARQ-ACK) in a physical uplink control channel (PUCCH) corresponding to the PDSCH; wherein
first information is included in the DCI and/or the RRC signaling, the first information being timing information for a transmission of the HARQ-ACK,
the RRC signaling includes second information regarding subcarrier spacing of the PDSCH and third information regarding subcarrier spacing of the PUCCH, and the second information and the third information are configured independently with each other,
the transmitting circuitry is configured to transmit fourth information on the HARQ-ACK in a transmission of the PUCCH within slot n+k,
index k is a number of uplink slots of the PUCCH and indicated by the first information, and
index n corresponds to a last uplink slot of the transmission of the PUCCH and the last uplink slot overlaps with a reception of the PDSCH.

2. The terminal apparatus according to claim 1, wherein a slot duration of an uplink slot of the PUCCH is dependent on the third information, and a slot duration of a downlink slot of the PDSCH is dependent on the second information.

3. A base station apparatus communicating with a terminal apparatus, the base station apparatus comprising:
transmitting circuitry configured to transmit downlink control information (DCI) in a physical downlink control channel (PDCCH) and transmit a radio resource control (RRC) signaling in a physical downlink shared channel (PDSCH); and
receiving circuitry configured to receive a hybrid automatic repeat request-acknowledgment (HARQ-ACK) in a physical uplink control channel (PUCCH) corresponding to the PDSCH; wherein
first information is included in the DCI and/or the RRC signaling, the first information being timing information for a transmission of the HARQ-ACK,
the RRC signaling includes second information regarding subcarrier spacing of the PDSCH and third information regarding subcarrier spacing of the PUCCH, and the second information and the third information are configured independently with each other,
the receiving circuitry is configured to receive fourth information on the HARQ-ACK in a reception of the PUCCH within slot n+k,
index k is a number of uplink slots of the PUCCH and indicated by the first information, and
index n corresponds to a last uplink slot of the reception of the PUCCH and the last uplink slot overlaps with a transmission of the PDSCH.

4. The base station apparatus according to claim 3, wherein
a slot duration of an uplink slot of the PUCCH is dependent on the third information, and a slot duration of a downlink slot of the PDSCH is dependent on the second information.

5. A communication method for a terminal apparatus communicating with a base station apparatus, the communication method comprising:
receiving downlink control information (DCI) in a physical downlink control channel (PDCCH);
receiving a radio resource control (RRC) signaling in a physical downlink shared channel (PDSCH); and
transmitting a hybrid automatic repeat request-acknowledgment (HARQ-ACK) in a physical uplink control channel (PUCCH) corresponding to the PDSCH; wherein
first information is included in the DCI and/or the RRC signaling, the first information being timing information for a transmission of the HARQ-ACK,
the RRC signaling includes second information regarding subcarrier spacing of the PDSCH and third information regarding subcarrier spacing of the PUCCH, and the second information and the third information are configured independently with each other, fourth information on the HARQ-ACK is transmitted in a transmission of the PUCCH within slot n+k, index k is a number of uplink slots of the PUCCH and indicated by the first information, and index n corresponds to a last uplink slot of the transmission of the PUCCH and the last uplink slot overlaps with a reception of the PDSCH.

6. A communication method for a base station apparatus communicating with a terminal apparatus, the communication method comprising:

transmitting downlink control information (DCI) in a physical downlink control channel (PDCCH);

transmitting a radio resource control (RRC) signaling in a physical downlink shared channel (PDSCH); and receiving a hybrid automatic repeat request-acknowledgment (HARQ-ACK) in a physical uplink control channel (PUCCH) corresponding to the PDSCH; wherein first information is included in the DCI and/or the RRC signaling, the first information being timing information for a transmission of the HARQ-ACK, the RRC signaling includes second information regarding subcarrier spacing of the PDSCH and third information regarding subcarrier spacing of the PUCCH, and the second information and the third information are configured independently with each other, fourth information on the HARQ-ACK is received in a reception of the PUCCH within slot n+k, index k is a number of uplink slots of the PUCCH and indicated by the first information, and index n corresponds to a last uplink slot of the reception of the PUCCH and the last uplink slot overlaps with a transmission of the PDSCH.

\* \* \* \* \*